(12) United States Patent
Paatela et al.

(10) Patent No.: US 7,539,195 B2
(45) Date of Patent: May 26, 2009

(54) SYSTEM AND METHOD FOR PROVIDING TRANSFORMATION OF MULTI-PROTOCOL PACKETS IN A DATA STREAM

(75) Inventors: Jeremy B. Paatela, Rockford, MN (US); Scott A. Sarkinen, Mounds View, MN (US); Hemant Vrajlal Trivedi, Cupertino, CA (US)

(73) Assignee: SLT Logic, LLC, Boston, MA (US)

( * ) Notice: Subject to any disclaimer, the term of this patent is extended or adjusted under 35 U.S.C. 154(b) by 253 days.

(21) Appl. No.: 11/224,692

(22) Filed: Sep. 12, 2005

(65) Prior Publication Data

US 2006/0209840 A1 Sep. 21, 2006

Related U.S. Application Data

(63) Continuation of application No. 09/849,804, filed on May 4, 2001, now Pat. No. 6,944,168.

(51) Int. Cl.
*H04L 12/28* (2006.01)

(52) U.S. Cl. .................. 370/392; 370/469; 370/401; 370/474

(58) Field of Classification Search .................. None
See application file for complete search history.

(56) References Cited

U.S. PATENT DOCUMENTS

| 5,541,920 | A | 7/1996 | Angle et al. |
|---|---|---|---|
| 5,566,170 | A | 10/1996 | Bakke et al. |
| 5,598,410 | A | 1/1997 | Stone |
| 5,600,598 | A | 2/1997 | Skjaveland et al. |
| 5,666,353 | A | 9/1997 | Klausmeier et al. |
| 5,764,641 | A | 6/1998 | Lin |
| 5,812,476 | A | 9/1998 | Segawa |
| 5,828,654 | A | 10/1998 | Takase et al. |
| 5,896,383 | A | 4/1999 | Wakeland |
| 5,901,095 | A | 5/1999 | Crafts |
| 5,907,511 | A | 5/1999 | Crafts |
| 5,923,596 | A | 7/1999 | Wu et al. |
| 5,943,481 | A | 8/1999 | Wakeland |
| 5,973,952 | A | 10/1999 | Crafts |
| 5,995,439 | A | 11/1999 | Watanabe et al. |
| 6,032,190 | A | 2/2000 | Bremer et al. |

(Continued)

OTHER PUBLICATIONS

"Frame Based ATM over SONET/SDH Transport (FAST)," The ATM Forum, Technical Committee, fb-fbatm-0151.000, Jul. 2000, 37 pgs.

(Continued)

*Primary Examiner*—Duc C Ho
(74) *Attorney, Agent, or Firm*—Patterson, Thuente, Skaar & Christensen, P.A.

(57) ABSTRACT

A system and method for facilitating packet transformation of multi-protocol, multi-flow, streaming data. Packet portions subject to change are temporarily stored, and acted upon through processing of protocol-dependent instructions, resulting in a protocol-dependent modification of the temporarily stored packet information. Validity tags are associated with different segments of the temporarily-stored packet, where the state of each tag determines whether its corresponding packet segment will form part of the resulting modified packet. Only those packet segments identified as being part of the resulting modified packet are reassembled prior to dispatch of the packet.

9 Claims, 16 Drawing Sheets

U.S. PATENT DOCUMENTS

| | | | |
|---|---|---|---|
| 6,046,979 | A | 4/2000 | Bauman |
| 6,046,980 | A | 4/2000 | Packer |
| 6,047,002 | A | 4/2000 | Hartmann et al. |
| 6,072,989 | A | 6/2000 | Witters et al. |
| 6,136,638 | A | 10/2000 | Lee et al. |
| 6,141,686 | A | 10/2000 | Jackowski et al. |
| 6,166,403 | A | 12/2000 | Castagnetti et al. |
| 6,167,445 | A | 12/2000 | Gai et al. |
| 6,175,568 | B1 | 1/2001 | Awdeh |
| 6,687,247 | B1 * | 2/2004 | Wilford et al. ............. 370/392 |
| 6,772,325 | B1 * | 8/2004 | Irie et al. .................... 712/238 |
| 7,116,680 | B1 * | 10/2006 | Kramer et al. ............. 370/465 |

OTHER PUBLICATIONS

William Wong, "Network Processors Take The High Road . . . And The Low Road," Electronic Design, Jul. 10, 2000, http://www.planetee.com/planetee/servlet/DisplayDocument?ArticleID=6798, Retrieved Jun. 15, 2001, 3 pgs.

"Network Processors Take The High Road . . . And The Low Road," Electronic Design, Jul. 10, 2000, http://www.planetee.com/planetee/servlet/DisplayDocument?AricleID=6799, Retrieved Jun. 15, 2001. 2 pgs.

Network Processors Take The High Road . . . And The Low Road, Electronic Design, Jul. 10, 2000, http://www.planetee.com/planetee/servlet/DisplayDocument?AricleID=6800, Retrieved Mar. 7, 2003. 3 pgs.

Network Processors Take The High Road . . . And The Low Road, Electronic Design, Jul. 10, 2000, http://www.planetee.com/planetee/servlet/DisplayDocument?AricleID=6802, Retrieved Jun. 15, 2001. 1 pg.

Network Processors Take The High Road . . . And The Low Road, Electronic Design, Jul. 10, 2000, http://www.planetee.com/planetee/servlet/DisplayDocument?AricleID=6804, Retrieved Jun. 15, 2001. 1 pg.

Network Processors Take The High Road . . . And The Low Road, Electronic Design, Jul. 10, 2000, http://www.planetee.com/planetee/servlet/DisplayDocument?AricleID=6806, Retrieved Jun. 15, 2001. 1 pg.

Network Processors Take The High Road . . . And The Low Road, Electronic Design, Jul. 10, 2000, http://www.planetee.com/planetee/servlet/DisplayDocument?AricleID=6808, Retrieved Jun. 15, 2001. 1 pg.

"EZchip Technologies Completes Filing Patent Applications For Its 10/40G Network Processor Core Technology," http://www.ezchip.com/html/press000918.html, printed Jan. 22, 2001, 3 pgs.

"7-Layer Packet Processing: A Performance Analysis, White Paper," EZchip, http://www.ezchip.com/html/tech_7layers.html, Retrieved Jan. 22, 2001, 8 pgs.

"Network Process Designs For Next-Generation Networking Equipment, White Paper," EZchip, http://www.ezchip.com/html/tech_nsppaper.html, Retrieved Jan. 22, 2001, 8 pgs.

"Glider Technology Report," EZchip, Sep. 2000, http://www.ezchip.com/html/glider.html, Retrieved Jan. 22, 2001, 2 pgs.

"Putting Routing Tables in Silicon," IEEE Network, vol. 6, No. 1, Jan. 1992, 11 pgs.

"Products," Applications, C-PORT, A Motorola Company, http://www.cportcorp.com/products/applications.htm, Retrieved Jan. 23, 2001, 3 pgs.

Husak et al., "Network Processor Programming Models: The Key to Achieving Faster Time-to-Market and Extending Product Life," C-PORT, A Motorola Company, May 4, 2000, 8 pgs.

"ABR Architecture and Simulation for an Input-Buffered and Per-VC Queued ATM Switch", Matthias Bossardt, Sueng-Yong Park, John W. Lockwood and Sung-Mo Kang, Nov. 1998, 6 pages, ipoint@ipoint.vlsi.uiuc.edu, Department of Electrical and Computer Engineering, University of Illinois at Urbana-Champaign, 405 N. Mathews Avenue, Urbana, IL 61801, U.S.A.*

"C-5™ Digital Communications Processor," C-PORT, A Motorola Company, Product Brief, May 2000, 8 pages.*

* cited by examiner

| Editor Instruction | Description |
|---|---|
| No-Op | No operation is performed |
| Write1 | General purpose single word write |
| Write2 | General purpose double word write |
| Delete1 | General purpose single word delete |
| Delete2 | General purpose double word delete |
| Read-Modify-Write with Mask | Single word modify; mask provided with data |
| Read-Modify-Write with Default Mask | Mask provided from one of a plurality of default masks |
| Swap | Swap the current top MPLS label |
| Swap/Push1 | Swap the current top MPLS label and push one other to the top |
| Push1 | Push one MPLS label to the top of the MPLS stack |
| Swap/Push2 | Swap the current top MPLS label and push two others to the top |
| Push2 | Push two MPLS labels to the top of the MPLS stack |
| Pop1/Swap | Pop the current top MPLS label and swap the next |
| Pop1 | Pop the current top MPLS label |
| Pop2 | Pop the two current top MPLS labels |
| PopAll | Pop all MPLS labels from stack |

Fig. 8

SYSTEM AND METHOD FOR PROVIDING TRANSFORMATION OF MULTI-PROTOCOL PACKETS IN A DATA STREAM

CROSS-REFERENCE TO OTHER PATENT APPLICATIONS

This application is a continuation of U.S. patent application Ser. No. 09/849,804, filed on May 4, 2001, now U.S. Pat. No. 6,944,168 entitled "SYSTEM AND METHOD FOR PROVIDING TRANSFORMATION OF MULI-PROTOCOL PACKETS IN A DATA STREAM", now U.S. Pat. No. 6,944,168.

The following patent applications of common assignee contains some common disclosure: "A Method And Apparatus For Providing Multi-Protocol, Multi-Stage, Real-Time Frame Classification", U.S. patent application Ser. No. 09/849,913, filed concurrently herewith, which is incorporated herein by reference in its entirety;

"System And Method For Policing Multiple Data Flows And Multi-Protocol Data Flows", U.S. patent application Ser. No. 09/849,914, filed concurrently herewith, which is incorporated herein by reference in its entirety;

"System And Method For Hierarchical Policing Of Flows And Subflows Of A Data Stream", U.S. patent application Ser. No. 09/849,810, filed concurrently herewith, which is incorporated herein by reference in its entirety.

FIELD OF THE INVENTION

This invention relates in general to communication networks, and more particularly to a method and apparatus for transforming packets in a multi-protocol, multi-flow data stream.

BACKGROUND OF THE INVENTION

Enhancing today's networking technology is a perpetual goal in the communications industry. As the raw speeds of large-scale and personal computing devices soar, the tremendous increase in data transmission demands continue to push the networking bandwidth envelope to capacity. As bandwidth-intensive multimedia content continues to gain popularity and course the veins of the Internet, the unrelenting bandwidth dilemma is no less urgent today than yesterday. This demand has fueled the need for high-bandwidth broadband systems.

The term "broadband" has often been used to describe high-bandwidth transmission of data signals, such as data, video, voice, video conferencing, etc. Broadband philosophies often address networking principles applicable to the backbone of the networking system, since the networking backbone generally faces the highest bandwidth demands. There are many competing technologies for delivering broadband access. For example, there are a number of standards used in digital telecommunications, including TCP/IP, Ethernet, HDLC, ISDN, ATM, X.25, Frame Relay, Digital Data Service, FDDI (Fiber Distributed Data Interface), Ti, xDSL, Wireless, Cable Modems, and Satellite among others. Many of these standards employ different packet and/or frame formats. The term "frame" is often used in reference to encapsulated data at OSI layer 2, including a destination address, control bits for flow control, the data or payload, and CRC (cyclic redundancy check) data for error checking. The term "packet" is often used in reference to encapsulated data at OSI layer 3. Further, the term "cell" is often used in reference to a group of bytes/octets conditioned for transmission across a network. However, it should be understood that for purposes of the present application, the terms packet, frame, and cell may be used interchangeably to refer to groups or collections of data. Further, a packet format or frame format generally refers to how data is encapsulated with various fields and headers for transmission across the network. For example, a data packet typically includes a destination address field, a length field, an error correcting code (ECC) field or cyclic redundancy check (CRC) field, as well as headers and trailers to identify the beginning and end of the packet. The terms "packet format" and "frame format", also referred to as "cell format", are generally synonymous for purposes of this application.

Packets transmitted across a network are associated with a transmission protocol. A protocol is a set of rules that governs how devices on a network exchange information. Packets traversing the network may be of differing formats or "protocols." This is often due to the development of incompatible proprietary protocols by computer manufacturers. While protocol compatibility and standardization are becoming increasingly important, even standard protocols provide multiple options and are not always interchangeable between applications. Further, new protocols will continue to be developed to address certain network limitations, or to otherwise improve network data transmission. All of these factors contribute to the reality that multiple transmission protocols exist, and will likely continue to exist.

Examples of typical protocols used to communicate information include the Internet Protocol (IP), which is a "best-effort," connectionless protocol responsible for delivering data from host to host across a network such as the Internet. IP is a predominant protocol used to transmit data across the Internet. Other protocols are used to transmit packets across the Internet as well, such as Framed ATM over SONET/SDH Transport (FAST) and IP on multiprotocol label switching (MPLS). FAST is a new protocol intended to improve the performance of asynchronous transfer mode (ATM). FAST introduces a variable length user data field, while preserving the proven advantages of ATM, such as real quality of service guarantees, the security and traffic isolation provided by virtual connections, network management, traffic management, control mechanisms for bandwidth on demand, etc. MPLS integrates layer-2 information about network links into layer-3 (IP) within a particular autonomous system in order to simplify and improve IP-packet exchange. MPLS essentially provides connection-oriented labeling in an otherwise connectionless environment, which has resulted in MPLS being considered associated with layer-2.5. With MPLS, different flows can be classified, and different service levels can be associated with the different flow classifications.

As described above, packets transmitted on a network such as the Internet may be associated with one of a number of different protocols, and thus packets associated with different protocols may be received at a given node, switch, router, etc. As described more fully below, the introduction of multiple packet protocols at a node requires special consideration when the entire data flow is subject to editing as the packets traverse the network.

Packets, frames, cells, and/or other data units traversing a network such as the Internet often face the possibility of being modified at a given network node. A variety of situations may result in a need to modify or "transform" the packet. For example, a packet reaching a node may need to be redirected from its original course to an alternate course. This can occur where an originally-intended node along the path becomes unavailable due to server problems, transmission cables being cut or otherwise damaged, and the like. In such a case, a "destination address" identified in a packet may require modification to alter the path of the packet in its quest to reach the ultimate destination. Another example of packet editing include the potential need to change header fields of the packet, such as packet length and checksum fields. If, for example, a packet is modified for any reason, the checksum and/or packet length fields are very likely to change, resulting in the need to further modify the packet to update such fields. Other fields include the time-to-live (TTL), packet conformance indicators such as colorations and drop priorities, etc. As can be seen, packets may require editing as they navigate the network towards their respective destination nodes.

At a particular network node or other ingress point, individual packets that make up a communications traffic stream can be classified into several flows or connections. Further, the traffic stream flows may include packets being transmitted in connection with different protocols. This can pose a challenge to editing systems, and typically requires that each of the flows be discretely handled. Due to very high data transmission speeds in today's networks, editing methods have conventionally required custom solutions, generally in the form of specialized, proprietary hardware engines in application-specific integrated circuits (ASICs). Because information may be transmitted across networks (e.g., the Internet) using a variety of different networking protocols, multiple specialized circuits are generally required to accommodate packets of each packet protocol that might traverse the network switch, router, bridge, or other intermediate system between the source and destination. For example, a separate packet transformation methodology, and therefore separate ASIC, may be required for each packet protocol used in the network. This results in higher costs, part counts, and general complexities, while adversely impacting system efficiencies.

Accordingly, there is a need in the communications industry for a method and apparatus for commonly transforming one or more packet flows of multiple transmission protocols. The present invention fulfills these and other needs, and offers other advantages over the prior art policing approaches.

SUMMARY OF THE INVENTION

To overcome limitations in the prior art described above, and to overcome other limitations that will become apparent upon reading and understanding the present specification, the present invention discloses a system, apparatus and method for facilitating packet transformation of multi-protocol, multi-flow, streaming data.

In accordance with one embodiment of the invention, a packet transformation module is provided for editing multi-protocol streaming data packets. An instruction memory receives search words identifying a packet type for the packet, and outputs appropriate instructions based on the packet type as indexed by the search words. A packet memory is coupled to receive one or more portions of the packet subject to editing, where each of the packet portions is stored in a respective memory segment of the packet memory. The packet transformation module further includes a valid bit array that has memory validity fields associated with respective memory segments. The state of each of the memory validity fields establishes whether the packet portion in the respective memory segment is to be incorporated into the resulting packet portion. A processing module receives the instructions from the instruction memory, and carries out the packet transformations on the packet portions in accordance with the instructions.

An ingress processing module is also provided. The ingress processing module includes such a packet transformation module, as well as a packet parser to parse each packet, and generate resulting search words based on the packet protocol. A network system is also provided which includes such an ingress processing module at an intermediary network node between the source and destination nodes, where the source node dispatches the information onto the network, and the destination node is the node to which the information is targeted.

In accordance with another embodiment of the invention, a method is provided for editing packets of a packet stream received at a network node. The method includes storing packet segments in partitionable memory segments of a modification memory. One or more editing instructions are elicited from an instruction memory, where the particular editing instructions elicited is based on characteristics of the packet. At least one packet segment stored in the modification memory is modified as directed by the editing instructions. Validity tags are associated with each of the memory segments to indicate whether or not their corresponding packet segments will be incorporated into a resulting modified packet. The resulting modified packet is created by assembling the packet segments associated with those validity tags that indicate incorporation into the resulting modified packet.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

The invention is described in connection with the embodiments illustrated in the following diagrams.

FIG. 8 illustrates a representative list of editor instructions in accordance with one embodiment of the invention;

DETAILED DESCRIPTION OF THE INVENTION

In the following description of the exemplary embodiment, reference is made to the accompanying drawings which form a part hereof, and in which is shown by way of illustration the specific embodiment in which the invention may be practiced. It is to be understood that other embodiments may be utilized, as structural and operational changes may be made without departing from the scope of the present invention.

Generally, the present invention provides a system and method for facilitating packet transformation of multi-protocol, multi-flow, streaming data. Packets of the data stream being communicated across the network using different transmission protocols can be appropriately edited regardless of the transmission protocol associated with the packets. Portions of each packet that are subject to change (but may not necessarily be changed) are temporarily stored. Certain instructions for effecting appropriate modifications to the particular packet are processed, with due consideration to the packet's protocol, which results in a protocol-dependent modification of the temporarily stored packet information. Validity tags are associated with different segments of the temporarily-stored packet, where the state of each tag determines whether its corresponding packet segment will form part of the resulting modified packet. Those packet segments identified as being part of the resulting modified packet are reassembled prior to dispatch of the packet.

Data transmitted over networks such as the Internet 10 may be in the form of e-mail messages, file transfers and downloads, web page loading, and the like. The data is generally broken up into a number of data packets, each of which is assigned a hierarchy of headers to direct the data packet to the desired destination, among other things. Each packet is separately dispatched to the destination, although more than one different route may be taken by the different packets associated with the data.

Figure 1:
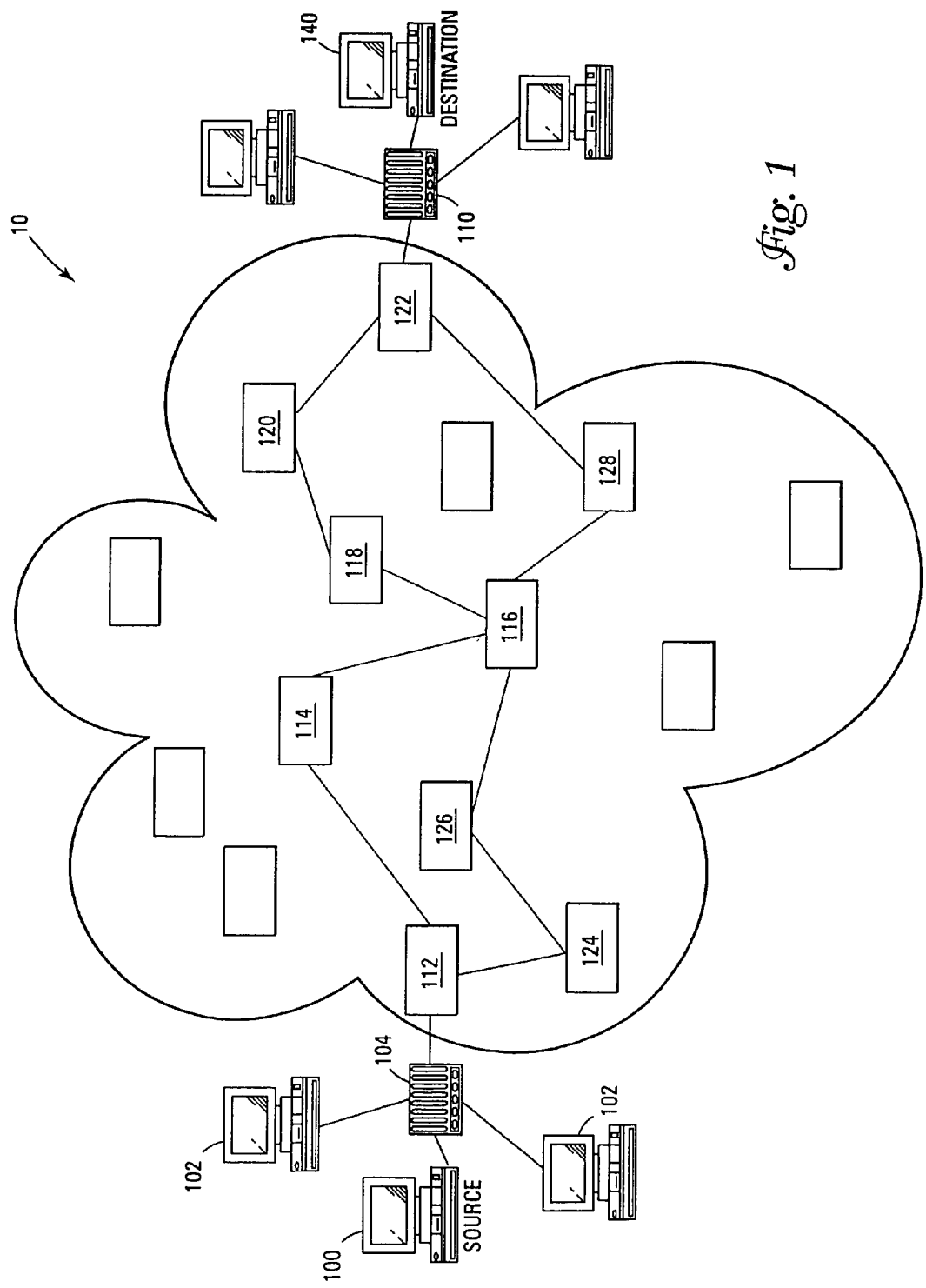
FIG. 1 is a block diagram illustrating a networking environment in which the principles of the present invention may be applied.

For example, the source computer 100 of FIG. 1 may be configured in a local area network (LAN) and coupled to other computers 102 via a hub 104. A first one or more data packets may reach the hub 110 of the destination LAN via a first path, through routers 112, 114, 116, 118, 120, and 122. A second one or more data packets may reach the hub 110 via a second path, such as through routers 112, 124, 126, 116, 128, and 122. These different packets may take alternative routes due to equipment congestion or failure of a node, or to load share where possible. The routers associated with the core of the Internet can reconfigure the paths that these packets follow. This is due to the router's ability to analyze the header information corresponding to the data packet and to communicate line condition and other information between routers. The routers handling data at the major traffic points on large networks, such as the Internet, are generally large stand-alone systems. After transmitting the data from node to node through the network, the packets are reassembled at the receiving end and availed to the desired destination system 140.

Because of the colossal bandwidth demands required of routers, a continual emphasis is placed on alleviating data throughput bottlenecks at routers, gateways, bridges, and other intermediate nodes along the network. Because routers take on the task of intercepting, analyzing, and moving on millions of packets per second along the best possible route, the processing occurring at these routers must be extremely efficient to avoid bogging down the system. The present invention may be used in connection with such routing systems, increasing speed and efficiencies of network data throughput.

As will be described more fully below, the present invention may be used in connection with multiprotocol route/flow classifying and policing engines. In one embodiment of the invention, the packet transformation in accordance with the present invention is housed in a package or chip common to the classifier and policing functionalities. The device enables advanced services to be applied at speeds of 10 Gbps or more. Tightly coupled parsing, policing, and packet transformation allows the collective device to perform dynamic packet transformation for quality of service (QoS) based on the current flow state and also effectively handles dynamic header processing such as required by multiprotocol label switching (MPLS) routers.

Figure 2:
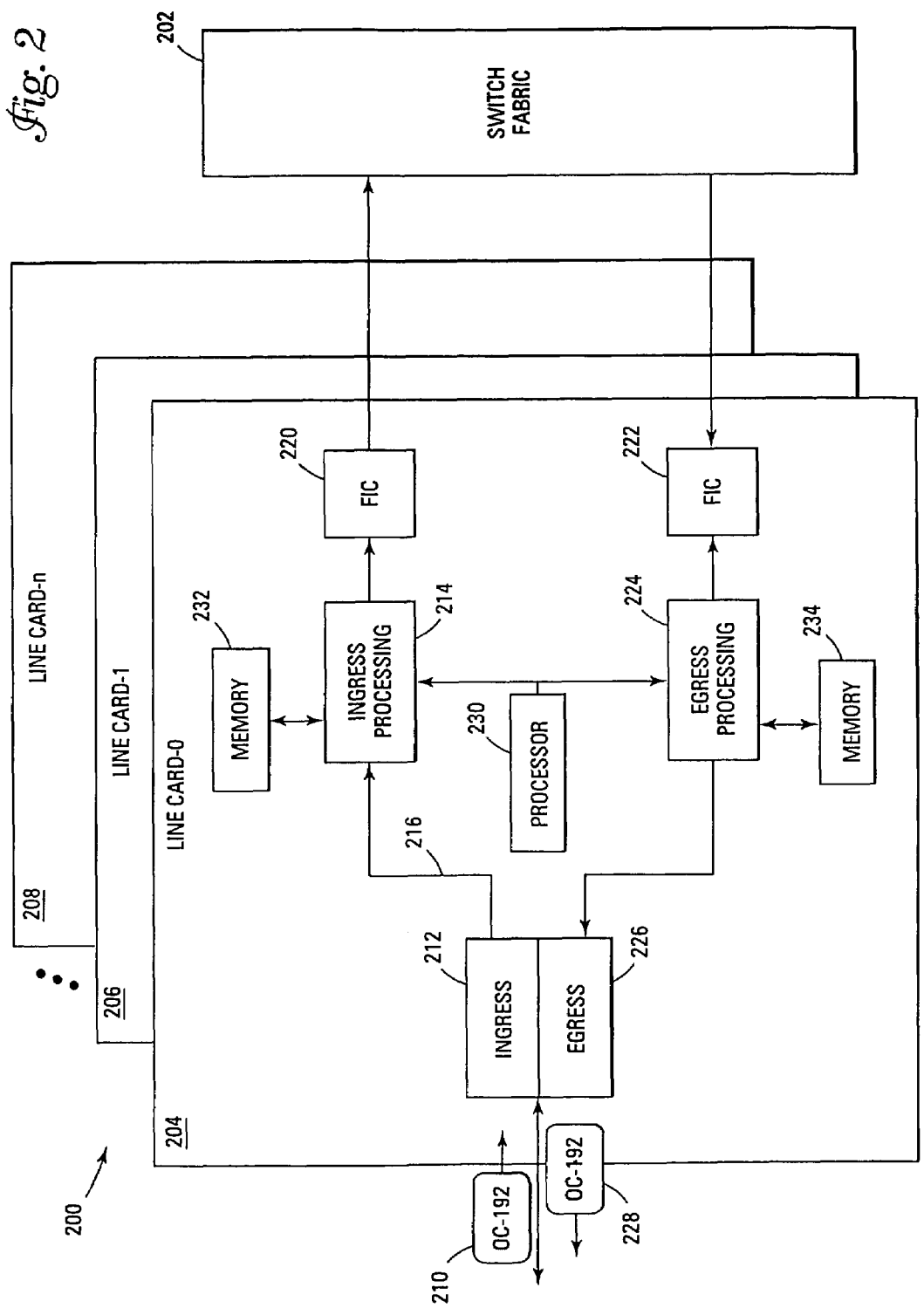
FIG. 2 is a block diagram of an embodiment of a router system in which the present invention may be applied.

Referring now to FIG. 2, one embodiment of a router system 200 is illustrated in which the present invention may be applied. One or more line cards are provided, each of which are coupled to a switch fabric 202. In the present example, a plurality of line cards are provided, including line card-0 204, line card-1 206 through a finite number of line cards represented by line card-n 208. In one embodiment of the invention, each of the line cards utilize analogous circuitry. Line card-0 204 will therefore be described, with the understanding that one or more of the remaining line cards in the router system may implement analogous circuitry.

The line card-0 204 of the illustrated embodiment receives as input packet-over-SONET/SDH (POS) frames via the network. As is known in the art, SONET/SDH is a high-speed time division multiplexing (TDM) physical-layer transport technology. POS provides a means for using the speed and management capabilities of SONET/SDH to optimize data transport, although originally optimized for voice. A SONET/SDH frame is 810 bytes and is normally represented as a two-dimensional byte-per-cell grid of 9 rows and 90 columns. The SONET/SDH frame is divided into transport overhead and payload bytes. The transport overhead bytes include section and line overhead bytes, while the payload bytes are made up of the payload capacity and some more overhead bytes referred to as path overhead. The overhead bytes are responsible for the management capabilities of SONET/SDH. The basic transmission rate of SONET (51.840 Mbps), referred to as Synchronous Transport Signal level 1 (STS-1), is achieved by sampling the 810-byte frames at 8000 frames per second. SONET features an octet-synchronous multiplexing scheme with transmission rates in multiples of 51.840 Mbps, whereby STS-192 thereby provides transmission at approximately 10 Gbps. Packet Over SONET/SDH (POS) allows core routers to send native IP packets directly over SONET/SDH frames. POS provides a relatively low packet overhead and cost per Mbit than other data transport methods, which allows POS to efficiently support traffic increases in IP traffic over existing and new fiber networks.

As shown in the exemplary embodiment of FIG. 2, incoming POS OC-192 frames 210 originate from another OC-192 device (not shown) and arrive at the line card-0 204 at the ingress framer 212. The frames are transferred to the ingress processing circuit 214 via an interface 216, such as the Optical Internetworking Forum (OIF) System Packet Interface-4 (SPI-4). OIF SPI-4 describes a data path interface between the physical and link layers to support physical line data rates up to 10 Gb/s, and may be used in connection with the present invention, as may other interfaces of appropriate speed.

Ingress processing circuit 214, which in one embodiment of the invention is housed in a single chip, performs the necessary lookups, policing, and editing of the packet. If necessary, the frame can be redirected to the host processor. The frames are fed out of the ingress processing circuit 214 via an OIF SPI-4 interface 218 to a Fabric Interface Chip (FIC) circuit 220. The FIC 220 converts the stream from one format to another, such as from POS frames to Common Switch Interface (CSIX) cells, and distributes the cells over the switch fabric 202.

Similarly, cells switched at the switch fabric 202 may be received at the FIC 222 and provided to the egress processing circuit 224. Frames are transferred to the egress framer 226, and output as POS OC-192 frames 228. A processor 230 may be coupled to the ingress processing circuit 214 and the egress processing circuit 224 to perform a variety of functions, including providing coprocessor support. Memories 232, 234 represent one or more memories associated with the ingress processing module 214 and the egress processing module 224 respectively.

Figure 3:
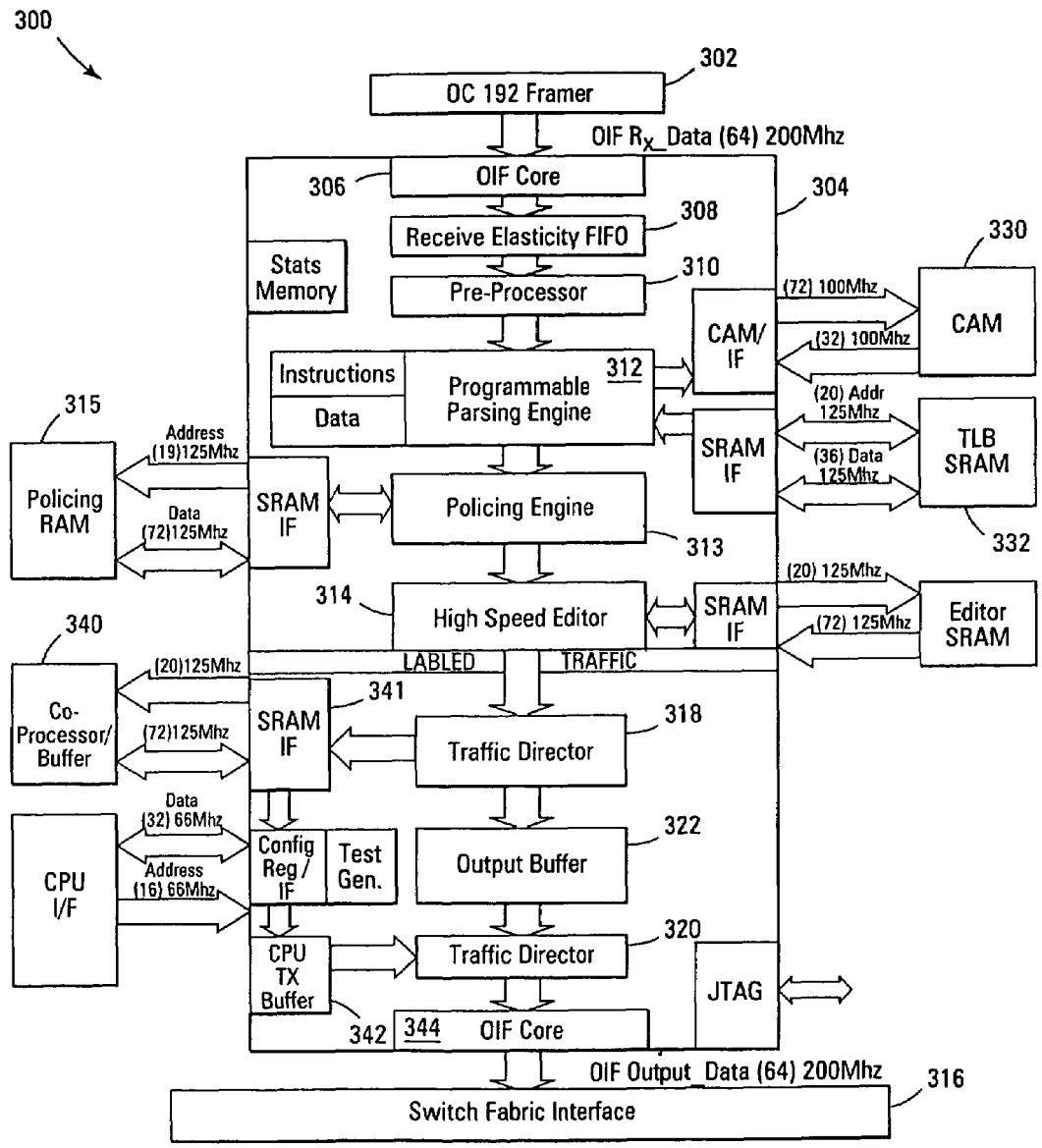
FIG. 3 is a block diagram of an exemplary embodiment of an ingress processing system in accordance with the present invention.

Referring now to FIG. 3, an exemplary embodiment of an ingress processing system 300 in accordance with the present invention is provided. The system 300 is described as an example of a system in which the principles of the present invention may be applied. The ingress processing system 300 interfaces to industry standard physical layer devices such as an OC-192 framer 302. In one embodiment of the invention, a portion of the ingress processing system 300 is housed on a single chip, illustrated in FIG. 3 as chip 304. While the invention is equally applicable where the physical chip boundaries differ from that illustrated in FIG. 3, the present invention is particularly efficient and useful in such a tightly coupled arrangement.

The interface 306, such as an OIF interface, provides the interface between the ingress processing circuit 304 and the framer 302. In one embodiment, the interface 306 is a 200 MHz OIF SPI-4 interface including a 64-bit data input. An elasticity buffer 308, which in one embodiment is a first-in-first-out (FIFO), provides temporary packet storage which allows table maintenance updates to be performed without dropping frames.

The pre-processor 310 performs a variety of functions, including packet verification and discarding, packet protocol identification, statistics compilation, and others. The packet protocol identification includes classifying the type of frame that has been received. The pre-processor identifies each layer protocol using a multistage algorithm coupled with a content-addressable memory (CAM) and memory (such as an SRAM) for resolving protocols. The frame is then stored in a memory along with the result of the preprocessor, i.e., the protocol layer code.

The parsing engine 312 performs layer classification and tagging via a search engine. One of the various functions of the parsing engine 312 is to parse the frames processed by the pre-processor, and generate search keys from data anywhere within the frame. The protocol layer code is used as a start vector into an instruction memory, which contains instructions for the parsing engine 312 and pointers to access selected words in a frame buffer. The parsing engine 312 receives the instruction and performs the functions selected by the corresponding instruction operational code. The results are used with an extractor that builds search keys which can be applied against a CAM (or indexed directly to a memory) to generate "search results" that contain the frame classification. Such parsing/classifying may be performed in a manner described herein and in copending U.S. patent application Ser. No. 09/849,913, entitled "A Method And Apparatus For Providing Multi-Protocol, Multi-Stage, Real-Time Frame Classification," filed concurrently herewith and assigned to the assignee of the instant application, the contents of which are incorporated herein by reference in its entirety.

The policing engine 313 performs a variety of functions, including ensuring flow conformance to a maximum allowed peak rate and a contractually obliged committed rate flow, utilizing, for example, DiffServ IP and MPLS. The policing engine 313 works with memory, such as policing RAM 315 which stores a drop policy for each connection.

The editor 314, also referred to as a packet transformation engine, utilizes the search results to index the appropriate editing instructions to be executed by an editing module. The editor 314 facilitates execution of multiple edits or "transformations" per packet as streaming data of various networking protocols associated with different networking layers is input into the editing module. The editor 314 supports comprehensive packet manipulation capability, including full MPLS labels, DAC operations such as multiple push and pop operations, as well as traditional routing operations such as TTL edits, checksum edits, policing edits, and other routing operations. The editor 314 therefore performs required frame/packet transformations to support routing of multi-protocol packets, such as IP, FAST, VPN, MPLS, etc. The editor is described more fully below.

The labeled traffic is ultimately directed to the switch fabric interface 316 through one or more traffic directors 318, 320 and output buffer 322. The traffic director 318 accepts frames from the editor 314, which are then passed to an output buffer 322 and/or the processor buffer 340 via the interface 341. Traffic director 320 accepts frames from the output buffer 322 and the processor transmit buffer 342, and passes the frames to the OIF interface 344 to the switch fabric interface 316.

Figure 4:
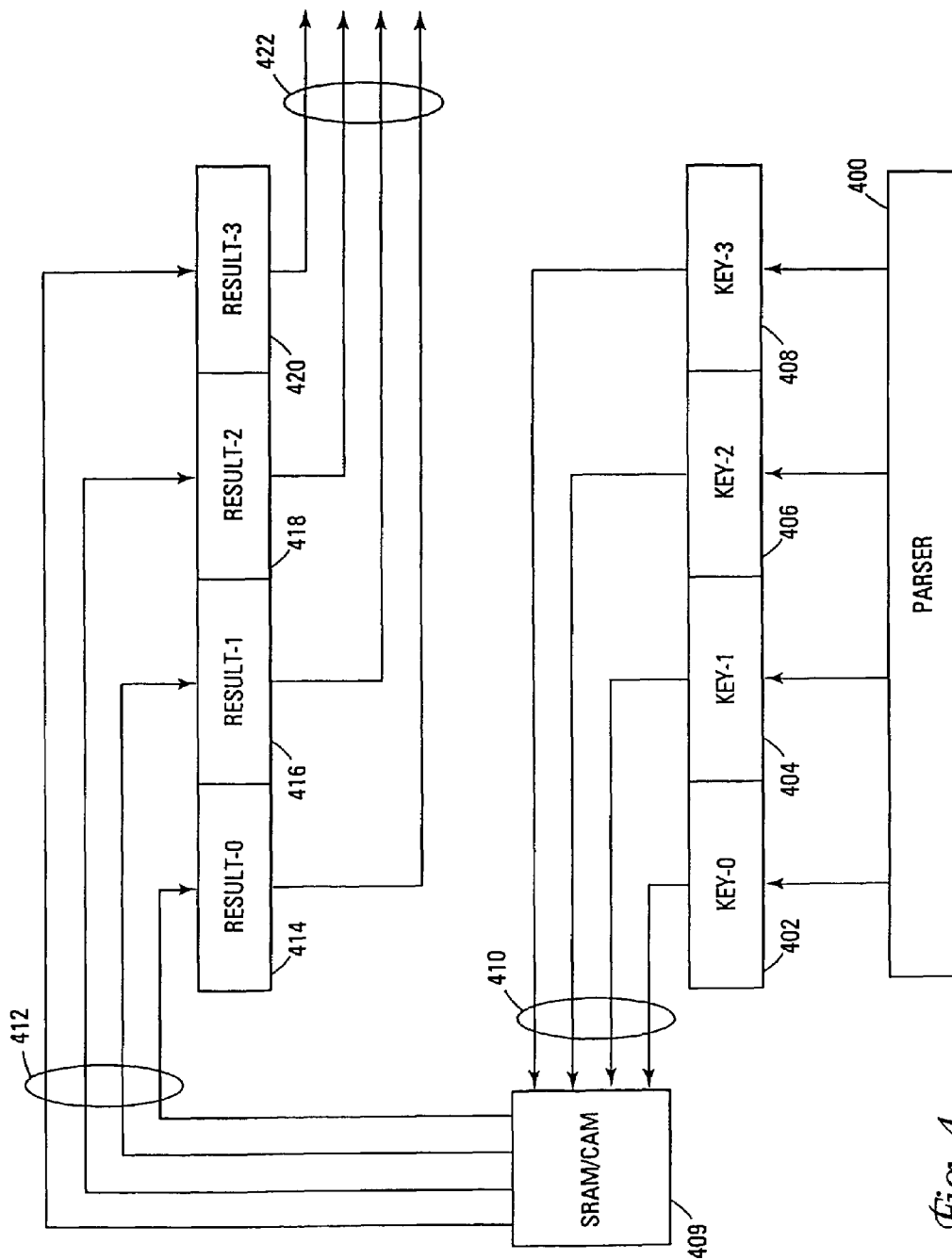
FIG. 4 is a block diagram of an embodiment of the interaction between the parsing engine, its corresponding memory, and the editor.

Referring briefly to the block diagram of FIG. 4, one embodiment of the interaction of the parsing engine 312, its corresponding memory 330, 332, and the editor 314 is shown. This diagram illustrates the generation of the search keys, which ultimately identify the appropriate search results to be accessed from the memory. The parser 400 (corresponding to parsing engine 312 of FIG. 3) outputs up to four "keys", labeled key-0 402, key-1 404, key-2 406, and key-3 408. These keys are sent to the content-addressable memory (CAM) and associated memory (collectively SRAM/CAM 409) via signal paths 410. An example of such a CAM is shown as CAM 330 in FIG. 3. In response, the CAM outputs an address to the associated SRAM, such as SRAM 332 in FIG. 3. The "keys" therefore identify the appropriate address information stored in the CAM, in order to address the desired search result information stored in the SRAM. The SRAM, or other memory, outputs the search results, shown in FIG. 4 as output on signal paths 412. Up to four search results can be addressed by a corresponding number of keys, and these four search results are illustrated as result-0 414, result-1 416, result-2 418, result-3 420. The search results are provided to the editor module as shown on signal paths 422.

Figure 5:
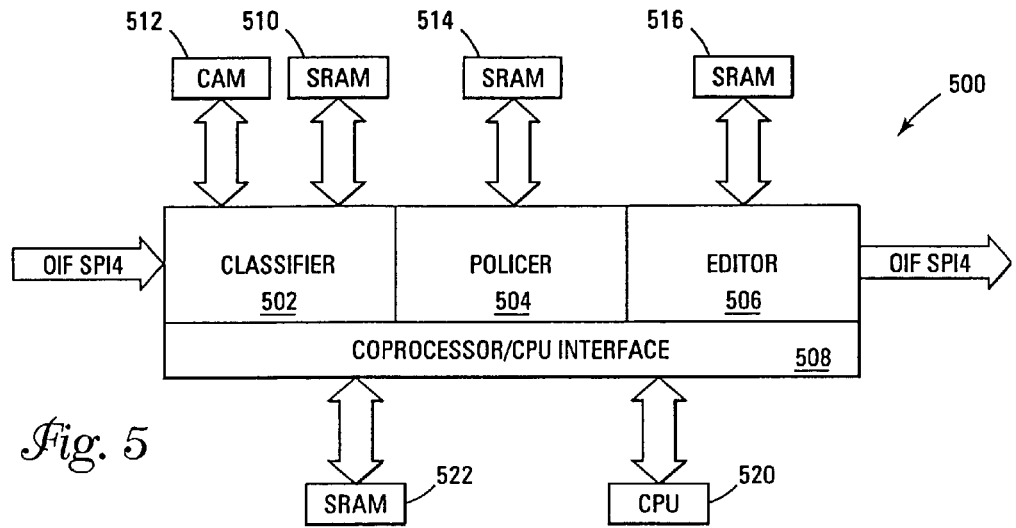
FIG. 5 is a block diagram illustrating selected functional blocks of an ingress processing system in accordance with the invention.

FIG. 5 is a block diagram illustrating selected functional blocks of an ingress processing system such as that described in connection with FIG. 3. The ingress processing system 500 of FIG. 5 illustrates the classifier functional block 502, the policer functional block 504, and the editor functional block 506. As described above, the classifier 502 builds queries (search words) to directly index a memory such as SRAM 510, or alternatively may search against a CAM 512 which in turn provides addresses to the SRAM 510. The policer 504 performs a variety of functions, including ensuring flow conformance to a maximum allowed peak rate and a contractually obliged committed rate flow, utilizing, for example, Diff-Serv IP and MPLS. The policer 504 works with memory, such as SRAM 514 which stores a drop policy for each connection. The editor 506 supports policing results and makes other appropriate modifications to the packet before being output from the ingress processing system 500. An external memory, such as SRAM 516, may be used to store the editor instructions. The coprocessor/CPU interface 508 provides for coprocessor/CPU support via interface 508, thereby allowing processor control, configuration, etc. of the classifier 502, policer 504 and editor 506. The interface 508 allows the system 500 to be coupled to a coprocessor and/or other CPU such as CPU 520, and to memory such as SRAM 522. In this manner, the ingress processing system 500 receives incoming packets, classifies and parses the packets according to predetermined criteria such as protocol, enforces policing functions on the packets, and modifies the packets accordingly before outputting the packets to the switch fabric.

In one embodiment of FIG. 5, the classifier 502, policer 504, editor 506 and coprocessor/CPU interface 508 are all provided on a single chip. The unique architecture combines the three key functions of classifying, policing and editing the data all through the tightly coupled arrangement facilitated by the integration into a common chip.

Figure 6:
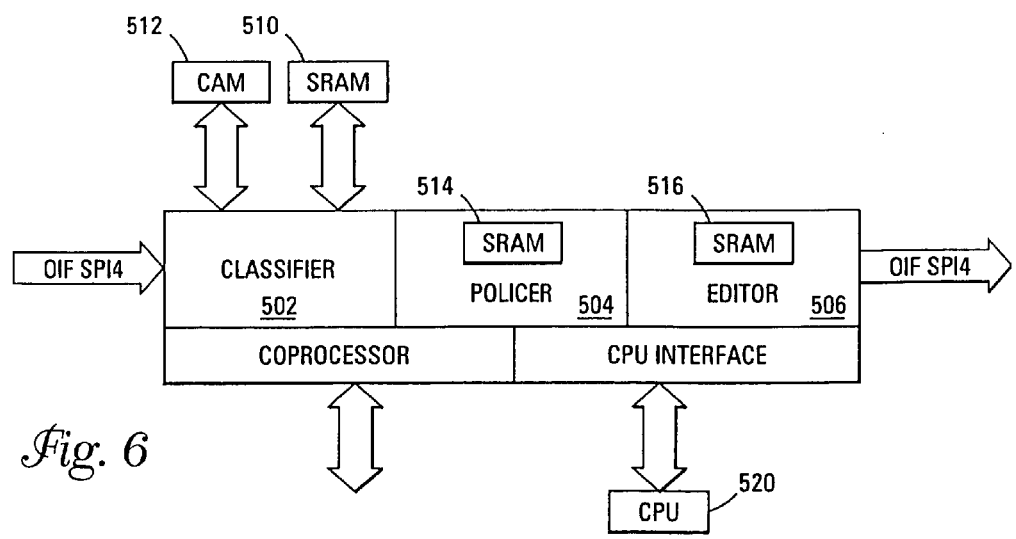
FIG. 6 is a block diagram illustrating selected functional blocks of an ingress processing system utilizing embedded memory in accordance with the invention.

It should be recognized that the buffers and memory identified in FIG. 5 may also be incorporated into the common chip, as shown in the embodiment of FIG. 6. In FIG. 6, the SRAM 514 is integrated with the policer 504, the SRAM 516 is integrated with the editor 506, and so on. Embedding these memories on the chip provides a lower chip count solution and increased "per flow" statistics.

Figure 7:
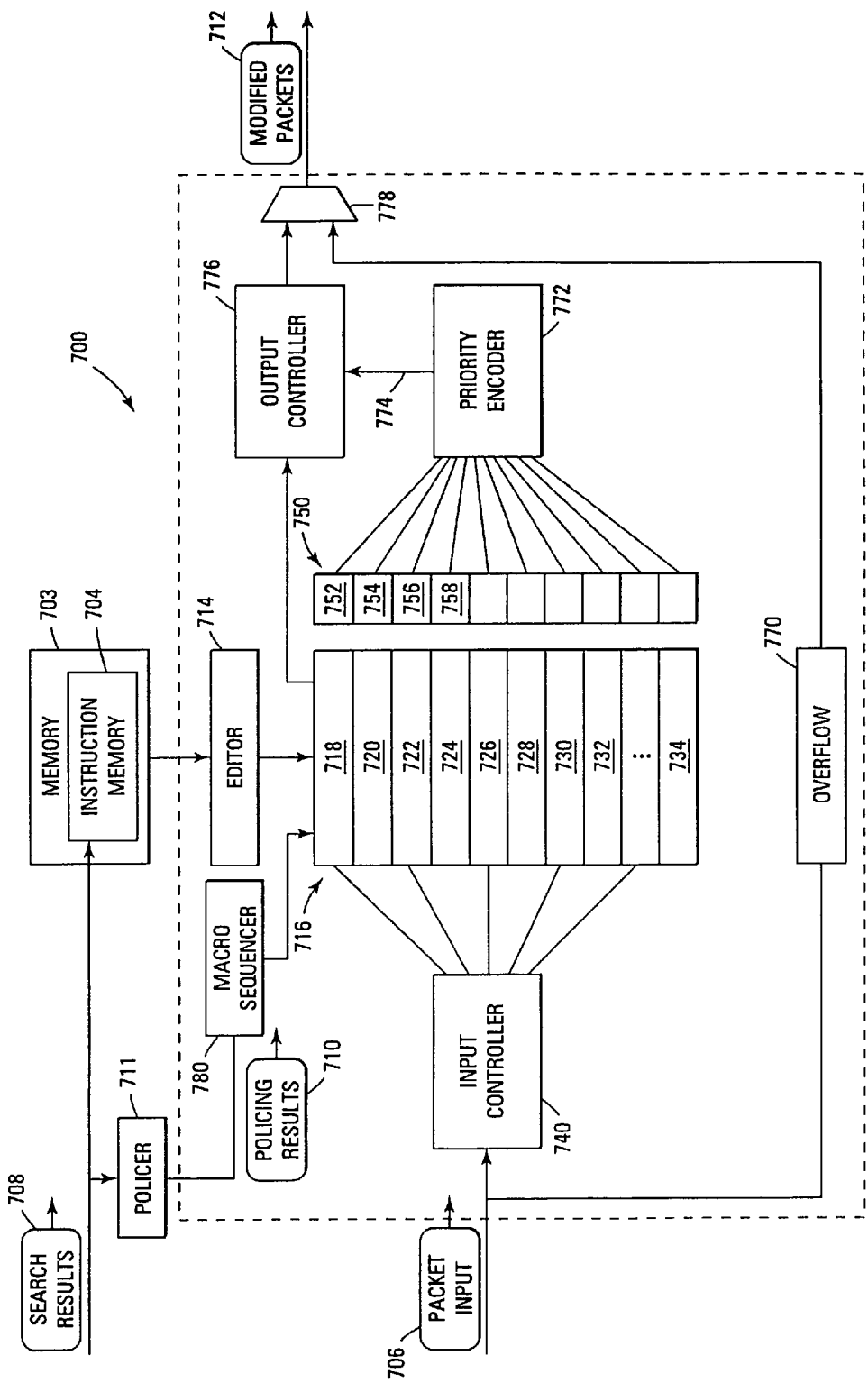
FIG. 7 is a block diagram of an editing apparatus in accordance with one embodiment of the invention.

FIG. 7 is a block diagram of an editing system 700 in accordance with one embodiment of the invention. The editing system 700, also referred to as a packet transformation system, includes an editing module 702 and an instruction memory 704. The editing system 700 provides an elastic queue to the downstream traffic director, and as described more fully below, allows for packet modification, and packet transformation such as from SONET packets to Ethernet packets, etc.

Inputs to the editing system 700 include packet/frame input ultimately originating from the pre-processor or the classifier and labeled as the "packet input" 706. Also input to the editing system 700 are the search results 708. These search results provide indices into the editor's 702 instruction memory 704, which is part of a memory 703 such as an SRAM. Policing results 710 from the policer 711 are also input to the editing module 702 to provide, for example, packet color modifications. The editing system 700 outputs modified packets 712, and in one embodiment, outputs the modified (and unmodified) packets to an elastic queue that is accessible by the traffic director.

Based on the search results 708, the editing system 700 retrieves instructions and data from memory 703 to perform corresponding actions. In one embodiment of the invention, the memory 703 and the instruction memory 704 are comprised of SRAM, and together comprise an external, non-embedded circuit to the editing module 702. The memory 703 is accessed independent of the editor itself, and configuration is performed with a register access interface (not shown).

During normal operation, the instruction memory 704 is read via an index provided in the search result 708. The search result 708 includes a "valid flag" indicating the search result is usable, and an "editor use" identifier within the search result 708 data indicating that the editing system 700 is to use the corresponding search result. As editor instructions and associated editor data are read from the external memory 703, they are provided to the editing processor 714. In one embodiment of the invention, the editing processor 714 includes a processing module such as a microprocessor, RISC processor, central processing unit, arithmetic processing unit (ALU), or other processor known in the art.

The editing processor 714 is provided with editor instructions from the instruction memory 704 and associated editor data from the memory 703. The editor instructions are executed to perform packet modifications and provide packet steering information. These instructions include general purpose data manipulation instructions such as write instructions, register swap instructions, etc., and also may include special purpose instructions specifically crafted to perform one or more predetermined operations. Such special purpose instructions may be particularly useful to perform certain networking-specific tasks that depend on the particular networking protocol. For example, specific instructions can be created to "pop" the top label in an MPLS label stack and swap the next MPLS label with a new label. This can be performed through a specifically-created instruction, or alternatively may be performed through a series of more generic instructions. For purposes of example, and not of limitations, example operations corresponding to editor instructions in accordance with one embodiment of the invention are provided in FIG. 8.

FIG. 8 illustrates a representative list of editor instructions in accordance with one embodiment of the invention. The representative editor instructions are listed in column 800, along with its corresponding description in column 802. Certain instructions may be general purpose to perform basic transformations and other instructions may be provided to handle specific packet protocols. The general purpose instructions will typically be available while the specific instructions per protocol may be optional. For example, one instruction may apply to multiprotocol label switching (MPLS) methodologies, where label switching is employed. Label switching refers to the approaches of forwarding IP (or other network layer) packets using label swapping forwarding algorithms under the control of network layer routing algorithms. A label-switched router is a device that implements such label switching. The classifier can identify which packets have been adapted for transmission in the MPLS domain, and the search results generated by the classifier can then be used to index the appropriate instruction(s) to operate on those MPLS packets.

The editing instructions illustrated in FIG. 8 are for purposes of illustration and not of limitation. These exemplary editing instructions allow the packets to be edited in various beneficial manners. The No-Op instruction performs no operation. A variety of general purpose instructions are provided, including the Write1, Write 2, Delete1, Delete2, Read-Modify-Write with Mask, and Read-Modify-Write with Default Mask. The Swap instruction causes a swap of the top memory element, such as the top MPLS label on an MPLS label stack. A Swap/Push1 instruction swaps the top memory element (e.g., MPLS label) and pushes one other data element (e.g., MPLS label) to the top position. The Swap/Push2 instructions operates analogously, but pushes two other data elements to the top of the memory space. The Push1 and Push2 instructions operate analogously, and push one or two data elements, respectively, to the top of the memory space. For example, a Push1 instruction may be used to push one MPLS label to the top of the MPLS stack. Pop1, Pop2, and PopAll instructions respectively pop the top one, two, or all data elements from the memory space. For example, the Pop2 instruction may be used to pop the two current top MPLS labels from the MPLS stack. A Pop/Swap instruction pops the top data element and swaps the next data element. For example, a Pop1/Swap instruction may be used to pop the current top MPLS label and swap the next.

As can be seen in the example of FIG. 8, many of the instructions may be crafted for execution with a particular type of packet protocol. The classification and parsing associated with the present invention ultimately presents search results that are used to locate the appropriate instruction to be processed by the editor. Therefore, the classifier/parser can determine, for example, the particular protocol of the incoming packet, thereby sending the appropriate search results to the editor to perform the correspondingly appropriate action on that packet based on the packet protocol. For example, a Push1 instruction may, in one embodiment of the invention, be dedicated to packets implementing the MPLS protocol such that execution of a Push1 instruction is only executed when a packet is an MPLS packet. This allows the multi-protocol ingress processing system to have generic, more specific, or very specific instructions addressable by search results that are based on parameters derived from the packet to be modified.

With certain editor instructions, associated editor data is provided. This editor data is, in one embodiment, stored with the instruction in the external memory 703. Depending on the editor instruction executed, the width of the editor data may vary. For example, in one embodiment, a 32-bit data segment is used in connection with the Swap, Push1, Pop1/Swap, Write 1, and Read-Modify-Write with Default Mask editor instructions. Further, a 64-bit data segment is used in connection with the Swap/Push1, Push2, Read-Modify-Write with Mask, and Write2 editor instructions. Finally, in accordance with this particular embodiment, a 96-bit data segment is used in connection with the Swap/Push2 editor instruction, as three data words are used for the Swap and either Push operations.

Editor instructions, such as those set forth in FIG. 8, represent those instructions used to modify packets/frames. The editor instructions also contain information used to drop the packet or steer the packet to its downstream destination(s).

Figure 9:
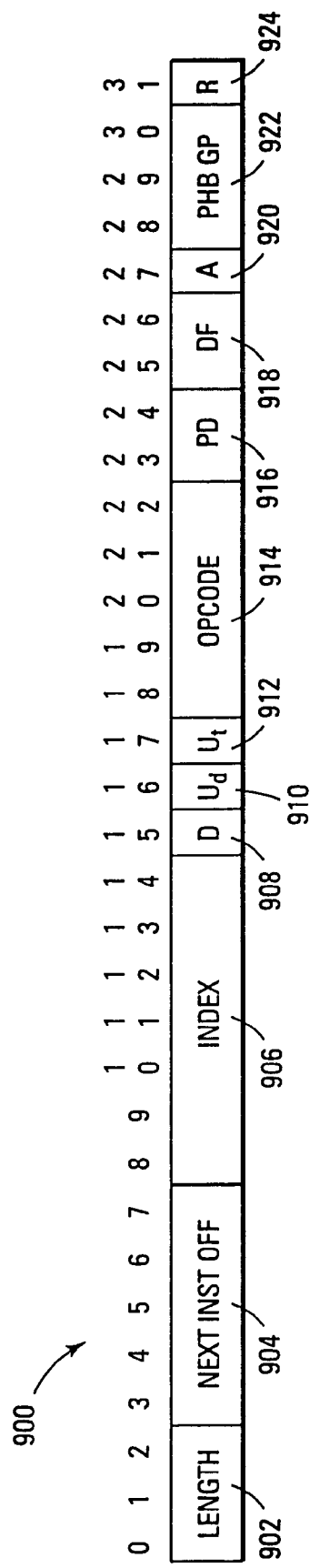
FIG. 9 is an exemplary editor instruction format which may be used in connection with the present invention.

FIG. 9 is an exemplary editor instruction 900 format which may be used in connection with the present invention. The entry length field 902 identifies the total length of this editor entry, in pairs of 64-bit words. The number of addresses read is determined by adding one to the value in this field and multiplying by two. This provides a minimum of two and a maximum of sixteen addresses read per entry, for this particular example. The next instruction offset field 904 indicates a relative offset of another editor instruction following the present instruction.

The index field 906 indicates various header type encodings. For example, a 0.times.18 may indicate a FAST Modify, a 0.times.1C may indicate an LLC/SNAP push, a 0.times.24 may indicate an MPLS swap, etc. In one embodiment, this field is seven bits to allow for a sufficient number of different currently-known or future types. In another embodiment, the seven bits provide an index into a 128-location memory, such as that shown in FIG. 7.

Field 908 is the decrement time-to-live (TTL) field, which identifies whether to decrement an incoming TTL/Hop count. Update ($U_d$) field 910 identifies an update of IP DiffServ (Differentiated Service) DSCP field to match information carried in the top MPLS label. Analogously, the update ($U_t$) field 912 identifies an update of IP TTL to match TTL carried in the top MPLS label.

Field 914 is the opcode field in which the instruction operational code is presented. An opcode for each different instruction operation is used, to identify the particular function (such as shown in FIG. 8) to be performed. Edits may be handled differently, depending on the particular type of packet protocol, and therefore a particular opcode may cause different functions to be performed for different types in type field 906.

Packet direction field 916 provides an indication of the downstream packet direction, such as to drop the packet, direct the packet to the control plane, direct the packet to the data plane, or direct the packet to the control plane and the data plane. The packet direction is applied from multiple search results according to the direction function presented in the direction function field 918. Various direction functions may be applicable, such as an OR function where the packet direction bits in the current instruction are logically "OR'ed" with the other search results, and such as an AND function where the packet direction bits in the current instruction are logically "AND'ed" with the other search results. Another bit code available in the direction function field 918 can cause the packet direction in the current instruction to override the previous search results.

Fields 920 and 922 correspond to per-hop-behavior (PHB) groups. PHB refers to the forwarding treatment given to a specific class of traffic, based on DiffServ criteria. Routers and switches use PHBs to determine priorities for servicing various traffic flows. A PHB group is a set of one or more PHBs that can only be meaningfully specified and implemented simultaneously. This often occurs where a constraint commonly applies to all PHBs in the set, such as a queue servicing or queue management policy. A PHB group provides a service building block that allows a set of related forwarding behaviors to be specified together (e.g., four dropping priorities). Field 920 is the "apply PHB group" which indicates whether to apply a PHB group identified in field 922 to the packet. This forces a new (or initial) DiffServ PHB group onto the packet, and overrides any previous PHB group assignments from preceding search results. The DiffServ PHB group field 922 identifies the PHB group to be applied to the packet. The multi-bit field 922 allows multiple PHB groups to be defined, such as various Assured Forwarding (AF) classes, expedited forwarding (EF), etc.

It should be recognized that the instruction format provided in FIG. 9 is for illustrative purposes only, as variations of the instruction format are well within the scope of the invention as will be readily apparent to those of skill in the art from an analysis of the description provided herein.

Returning to FIG. 7, the instructions/data from the memory 703 are processed by the editing processor 714, and operate on data stored in the memory 716. The memory 716 includes a plurality of memory locations, illustrated in FIG. 7 as memory locations 718, 720, 722, 724, 726, 728, 730, and 732 through some finite number of memory locations up to the end memory location 734. The memory 716 stores portions of the packet input 706, and stores these packet portions in memory locations 718-734 as dictated by the input controller 740. In one embodiment of the invention, the packet 706 is stored in the memory 716 in time for the editing instructions from the instruction memory 704 to be processed by the editing processor 714, and for the packet data in the memory 716 to be operated on by the editing processor 714.

The memory 716 is organized into a finite number of segments that may include one or more of the memory locations 718-734. The memory 716 is partitioned such that at least some of these segments are allocated to store data corresponding to certain portions of the packet(s) 706. In one embodiment of the invention, these packet portions correspond to headers of the various protocol layers associated with the incoming packet. For example, header information corresponding to OSI networking layers two through four may each correspond to a segment of the memory 716, such that a segment of memory 716 is allocated to store a layer-2 header (e.g., a PPP header), a segment corresponding to a layer-2.5 header (e.g., an MPLS label stack), a segment corresponding to a layer-3 header (e.g., an IP header), and a segment corresponding to a layer-4 header (e.g., a TCP header). The input controller properly directs this information to the memory 716 based on upstream information developed by a packet classification engine that determines where one networking layer header ends and the next networking layer header begins.

The memory 716 in one embodiment of the invention is a dual-port memory. A dual-port memory can be simultaneously read and/or written by two different data sources, or more generally, a shared memory accessible by two processes. In one embodiment, the data stream is a 64-bit data stream, and the memory 716 is a 32-bit wide, 128-word deep, dual-port memory. In this manner, two 32-bit words may be simultaneously written to the memory 716 to write the 64-bit data. Alternatively, data can be concurrently written to and read from the memory 716. A dual-port memory could also be utilized to streamline the data flow through the editor, for instance, by "overlapping" the input write stage of the processing with the output read stage of the processing. In other embodiments of the invention, a single-port memory may be used, or two physically distinct yet logically coupled memories may also be used. Using a quad-port memory or other multi-port memory will produce analogous results and provide similar advantages.

In accordance with the invention, the allocated segments of memory are interleaved with segments of the memory 716 that are unused during the input stage, each unused segment including one or more of the memory locations 718-734. This allows selected ones of the allocated memory segments to be edited for subsequent serial output. For example, if memory location 718 stores an Ethernet header and memory location 722 stores an IPv4 header, the Ethernet header can be modified by writing a new Ethernet header into an otherwise unused, interleaved memory location 720, and disregarding the original Ethernet header in memory location 718. When the memory locations are read out in the proper order, the new Ethernet header in memory location 720 effectively replaces the original (now-disregarded) Ethernet header at memory location 718. In this manner, editing of packet layer headers can be effectively and efficiently performed.

The present invention also facilitates editing through the use of a valid bit array 750, which includes a field for each of the various memory segments, or memory locations, of the memory 716. Information in each field of the valid bit array 750 identifies whether or not its corresponding memory segment/location is currently housing valid data—that is, whether its corresponding memory segment/location will ultimately be part of the resulting output packet. For example, if the indicators in fields 752, 756 and 758 are set to signify valid data in corresponding memory locations 718, 722 and 724, then the resulting output packet will include the data in memory locations 718, 722 and 724. If the indicator in field 754 is not set, it signifies that the data in corresponding memory location 720 is not to be included with the resulting output packet. Each of the fields in the valid bit array 750 is therefore associated with a portion of the memory 716, in order to indicate whether or not the corresponding memory portion is storing valid data.

Using the valid bit array 750 and due to the interleaving of available memory space with the designated data storage areas, data in the memory 716 may be overwritten, deleted, or added. For example, the data in a memory segment may be overwritten by actually overwriting the data at that memory segment, and keeping the associated indicator in the valid bit array 750 in a state indicating the corresponding data is valid. Alternatively, the data in the memory segment may be effectively overwritten by inserting replacement data in the available memory space proximate the original data, and manipulating the bits in the corresponding fields of the valid bit array 750 such that the original data is no longer "valid" and the newly inserted data is now deemed valid. This is accomplished by setting the indicator in the field of the valid bit array 750 corresponding to the newly inserted data to an asserted state, and setting the indicator in the field of the valid bit array 750 corresponding to the original data to an unasserted state. Further, the data in the memory segment may effectively be "deleted" from consideration in the resulting output packet by setting the indicator in the field of the valid bit array 750 corresponding to the data to be deleted to an unasserted state. As a further example of a modification to data in the memory 716, a new data segment (e.g., a new header corresponding to a new network layer) may be inserted into the reserved, available memory space that was interleaved with the designated data storage areas. For example, assume that memory location 718 stores a PPP header and memory location 722 stores an IPv6 header, an MPLS header can be injected between the PPP header and the IPv6 header by writing the MPLS header into otherwise unused memory location 720.

In one embodiment of the invention, the valid bit array is implemented in one or more registers, where each bit of the register provides the field in which an indicator or flag relating to the validity of the corresponding data may be set or cleared. As will be readily apparent to those skilled in the art from the description provided herein, the number of bits used in each field may be one or more bits, as long as it adequately identifies the status of the data in its corresponding field in the memory 716.

Further, from the description provided herein, it will be readily appreciated by those skilled in the art that data in the memory 716 may be added, deleted, amended, moved, expanded in size, reduced in size, or otherwise manipulated within the memory 716, as long as the appropriate indicators in the valid bit array 750 are appropriately manipulated. For example, the interleaving of unused memory space with the various designated data storage areas (e.g., partitioned to store header data) allows the data in memory location 726 to be expanded to memory locations 726 and 728. This might be the case where a header needs to be modified such that it increases in length. While headers generally have a fixed length, it is conceivable that network layer headers are of variable length, requiring header length expansion, or reduction. The present invention allows for such modifications.

As another example, it may be desirable in some instances to move the data in the memory 716 to a different location, and the interleaved unused memory space facilitates such movement. In some instances, it is conceivable that multiple new headers will need to be inserted between two existing headers, and the existing headers stored in the memory 716 may be moved farther apart to make room for the new headers. As can be seen, a wide range of flexibility and efficiency is provided by the editing configuration of the present invention.

The memory 716 may, in one embodiment, be configured and partitioned such that all header information and data is stored within the memory 716. However, the "data" that is being transmitted generally should not be modified along the way between the source and the destination. This would in effect be corrupting the data, and it is thus generally the case that the data being transmitted will remain unchanged from source to destination. Therefore, a preferred embodiment of the invention includes an additional memory module, illustrated in FIG. 7 as the overflow buffer 770. The data associated with the packet is stored in the overflow buffer 770 until the header information is released, whether modified or not, from the memory 716. The data in the overflow buffer 770 is appended to the resulting header information from the memory 716 such that the packet is essentially recreated upon its output from the editor module 702, albeit the header information may have been modified.

Other packet information other than the associated data may also be stored in the overflow memory module 770. For example, the memory 716 may be configured to allow editing of certain, predetermined network layer headers, such as the headers including and between network layer-2 and network layer-4. In this example, headers corresponding to higher network layers (e.g., network layer-5) may remain embedded with the data portion of the packet, thereby being sent to the overflow buffer 770. In this particular example, this also means that headers outside of the layer-2 through layer-4 range are not available for modification at the editor module 702. The particular information allowed to be edited may therefore be configured into the system, such that as much or as little of the packet as desired may be configured or partitioned into the editing memory 716 as dictated by the particular implementation.

After the packet information in memory 716 has been edited, the editor module will reassemble and output the packet. This is accomplished by outputting the information in the memory 716 in the proper order, followed by the data stored in the overflow buffer 770. In one embodiment of the invention, the information in the memory 716 (e.g., network layer header information) is output in an order from lower memory addresses to high memory addresses (or alternatively from high to low memory addresses). The header information in these memory locations 718-734 will therefore be output in the order that it is stored, and only if its corresponding indicator in the valid bit array 750 is asserted. In an alternative embodiment of the invention, additional indicator bits, either associated with the valid bit array 750 or in an independent memory, identify the order in which the memory locations 718-734 will be read out.

In a preferred embodiment, the information stored in memory locations 718-734 will be output in a predetermined order, such as from the lowest memory 716 address to the highest memory 716 address. This corresponds to first outputting the information in memory location 718, then in memory location 720, and so forth, as dictated by the state of the corresponding bits in the valid bit array 750. The valid bit array 750 is read by a priority encoder 772. A priority encoder assigns a code representation to the outputs, represented by line 774 to the output controller 776. Therefore, depending on which of the fields of the valid bit array 750 are set, the priority encoder 772 instructs the output controller 776 to pass information in corresponding memory locations 718-734 to the multiplexer 778. In one embodiment of the invention, the priority encoder 772 is configured as part of the output controller 776.

The output controller outputs the header information stored in the memory 716 in the order dictated by the valid bit array 750 and designated in response thereto by the priority encoder 772. The priority encoder 772 takes a snapshot of the valid bit array 750 when editing is complete to identify the populated memory locations that will form the resulting packet header. The multiplexer 778 passes this resulting header information, and upon reaching the end of the header information, the multiplexer controllably switches to pass the information at its other input, which is fed from the overflow buffer 770. Therefore, the multiplexer 778 first passes the edited header information from the populated, valid memory locations in memory 716. The multiplexer then appends the associated data stored in the overflow buffer 770 to reassemble the packet as a modified packet 712.

Figure 10:
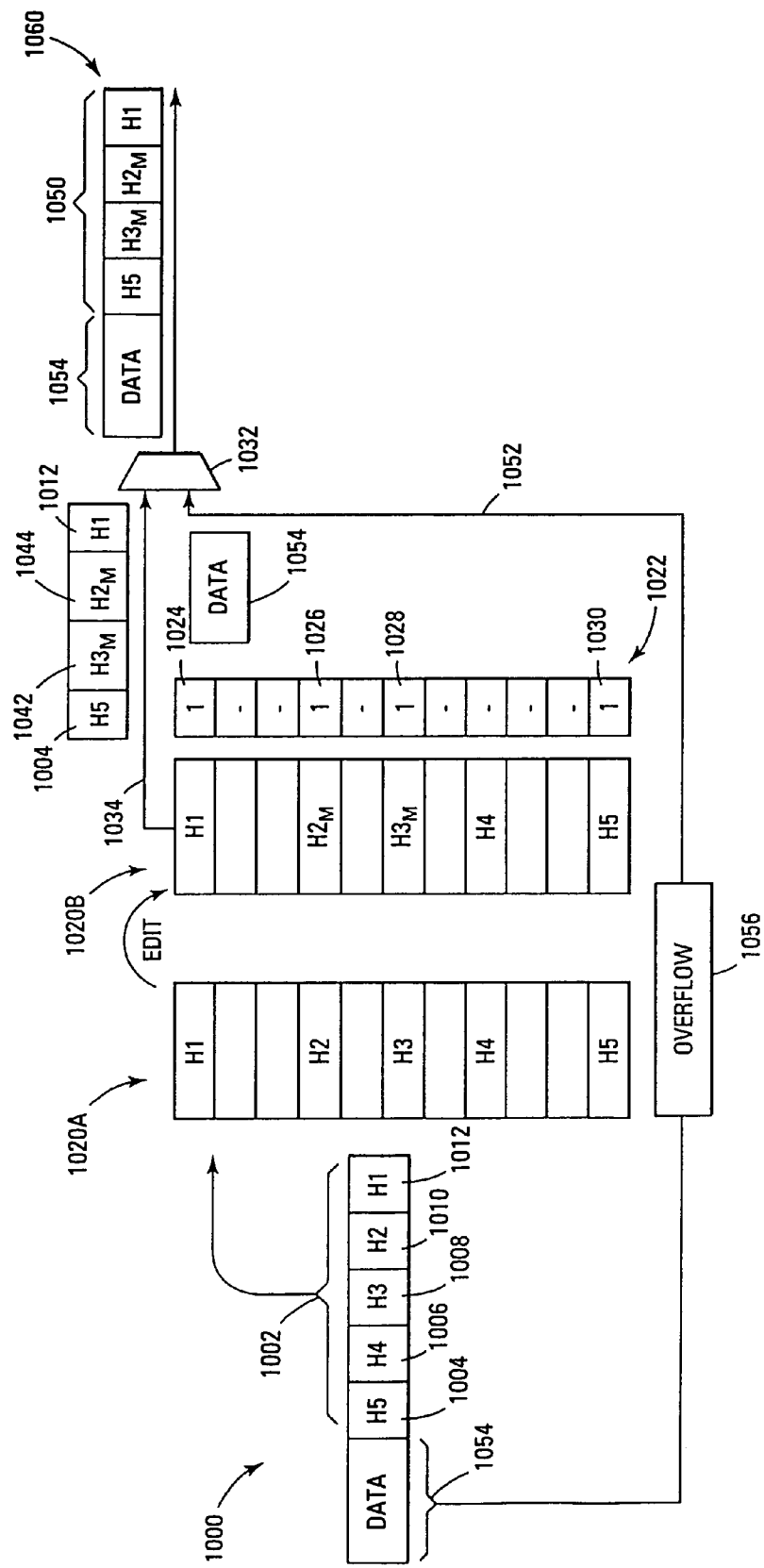
FIG. 10 provides an exemplary illustration of receipt of a packet, partitioning the header information with interleaved memory space, editing of the information, and reassembly of a resulting packet.

FIG. 10 provides an illustration of receipt of a packet, partitioning the header information with interleaved memory space, editing of the information, and reassembly of a resulting packet. A packet 1000 includes a header 1002, which still further includes at least five header segments, H5 1004, H4 1006, H3 1008, H2 1010 and H1 1012. The header fields 1002 are stored in the memory 1020A. After editing, the memory 1020B includes the modified headers, and more particularly includes modified header H2.sub.M and H3.sub.M. The valid bit array 1022 includes four indicators of valid memory locations. These valid bit array indicators are shown in valid bit array fields 1024, 1026, 1028 and 1030. Therefore, the header information corresponding to these valid bit array fields are directed to the multiplexer 1032 via path 1034. These newly edited header segments are shown as header segments H5 1004, H3.sub.M 1042, H2.sub.M 1044 and H1 1012 which are output by the multiplexer 1032 as header 1050. A control input (not shown) on multiplexer 1032 then switches the output of the multiplexer 1032 from the input from path 1034 to the input from path 1052. This input includes the data 1054 previously stored in overflow buffer 1056. The multiplexer 1032 outputs the data 1054 to be appended to the outgoing packet 1060.

Returning again to FIG. 7, one embodiment of the editor module 702 further includes a module for performing additional manipulations on the data stored in the memory 716. This module is illustrated as the macro sequencer 780, which performs macro editing. In one embodiment, this macro editing is performed after the editor 714 has completed processing of its instructions from the instruction memory 704. The macro sequencer 780 operates on the data in memory 716 just as the editor 714 does, however the macro sequencer performs more specific data modifications, and does so based on different criteria than the editor 714. For example, in one embodiment, the editor 714 is a microprocessor or arithmetic logic unit that operates on the data in the memory 716 on a 32-bit boundary. These operations are generally those provided in connection with the particular editor processor 714 being implemented. However, the macro sequencer operates on the possibly edited data in the memory 716, and performs more specific modifications to the resulting packet, such as network-specific data adjustments when used in a networking environment. Thus, in one embodiment, both the editor 714 and the macro sequencer 780 operate on the data in memory 716, but the editor is first in time with respect to performing operations on the data in memory 716.

One task of the macro sequencer is to perform functions on the data in the memory 716 that it is inefficient or otherwise undesirable to dedicate editor instructions to. The macro sequencer 780 also gathers certain information to make its final adjustments to the data. For example, a particular header, such as an IP header, may include a field for a checksum value. If one or more of the headers in the memory 716 are edited, the checksum value must be updated. Because the editing module 702 operates on streaming data, the macro sequencer operates as a state machine and monitors the activity occurring on the data in the memory 716. When the editor 714 has completed its modifications to the data in the memory 716, the macro sequencer 780 will have monitored the activity, ascertained the new checksum value, and input it into the precise location within the appropriate memory location. Thus, the macro sequencer 780 monitors activity as the editing process continues, and when the editing process is complete, then the macro sequencer performs some "after-the-fact" modifications that it learned throughout the editing process.

There are numerous examples in which the macro sequencer will perform these post-editing-processor modifications. The checksum described above is one example. Another example is the update of the time-to-live (TTL) field of an IP packet header. The TTL field represents an amount of time that the packet has been in the network, and suggests, upon expiration or reaching a predetermined value, that the packet has been in the network too long and should be discarded. The TTL is therefore decremented at each router, thereby requiring special modification of the TTL field in the IP header of the memory 716 after editor 714 manipulation of the data. The TTL generally corresponds to the number of hops that have been encountered by a packet, but can also reflect a particular passing of time. Still other examples in which post-editing-processor modifications will be performed include policing colorations, and packet length. For example, a proprietary packet length may result from the addition of a local header as the packet travels through the router. The addition of a local header changes any packet length fields stored in the header information of the memory 716.

The macro sequencer 780 also works in connection with the policer 711. Generally, network policing allows subscriber bandwidth to be controlled in terms of the contracted service levels that were provisioned and is typically used at the ingress of the network. One manner for policing, for example in an MPLS network, is Single Rate Tri-Color Marker (srTCM) or (trTCM) Two Rate Tri-Color Marker. Tri-Color marking provides a mechanism for marking packets when they exceed the contracted bandwidth.

The srTCM meters a traffic stream and marks its packets according to three traffic parameters, Committed Information Rate (CIR), Committed Burst Size (CBS), and Excess Burst Size (EBS), to be either green, yellow, or red. A packet is marked green if it doesn't exceed the CBS, yellow if it does exceed the CBS, but not the EBS, and red otherwise. The trTCM meters an IP packet stream and marks its packets based on two rates, Peak Information Rate (PIR) and Committed Information Rate (CIR), and their associated burst sizes to be either green, yellow, or red. A packet is marked red if it exceeds the PIR. Otherwise it is marked either yellow or green depending on whether it exceeds or doesn't exceed the CIR. These techniques help manage network congestion at the output link, allowing the right packets to be discarded while facilitating fairness of resource usage.

The policer 711 performs packet conformance functions, and deals with such coloration issues. The macro sequencer 780 is coupled to receive information such as the coloration, and an indication of whether or not to drop the packet, from the policer 711. The macro sequencer can manipulate the appropriate bits in the appropriate header field in the memory 716 in response to coloration issues. For example, if the policer 711 determines that the current packet has exceeded its bandwidth, the policer 711 will provide a particular color to the macro sequencer 780. In response, the macro sequencer 780 modifies the bits in the appropriate network layer header to reflect the particular color, such as by modifying the type of service (TOS) field in an IPv4 header.

Policing may be determined in a manner described herein and in copending U.S. patent application Ser. No. 09/849,914, entitled "System and method For Policing Multiple Data Flows And Multi-Protocol Data Flows," and copending U.S. patent application Ser. No. 09/849,810, entitled "System And Method For Hierarchical Policing Of Flows And Subflows Of A Data Stream," both filed concurrently herewith and assigned to the assignee of the instant application, the contents of both being incorporated herein by reference in their respective entireties.

The macro sequencer 780 may therefore be represented by a state machine that is snooping what stage of the editing process is occurring, snooping the incoming data, snooping the actual editing process, collecting input from the policer, and performing final modifications to the stored packet header information before it is output. The macro sequencer 780 allows various specific modifications on the data in the memory 716.

The editor module 702, using at least the policer 711 and the macro sequencer 780, therefore also handles packet dropping for nonconforming packets. The policer 711 informs the macro sequencer 780 when a packet is to be dropped and the macro sequencer 780 in turn directs the editor module 702 to deny passage of the header information in the memory 716 and the data in the overflow buffer 770 to the output stage. Therefore, to drop a packet currently in the memories 716, 770, the corresponding information is not allowed to be output and attention simply turns back to the input stage to receive the next packet and store the packet in the memories 716, 770.

The editor module 702 of FIG. 7 may be controlled by configuration options, programmable via a register interface (not shown). These configuration options may include the manner in which packet handling is to be provided, including packet dropping and the downstream packet direction discussed above. The packet direction may be influenced by the editor instructions, or may be a programmed response to packet error conditions and policing. The direction eventually applied to the packet follows a hierarchical structure in one embodiment of the invention. For example, in one embodiment, a hierarchical structure for determining the ultimate direction includes, from highest priority to lowest priority, a master override action, error conditions, policing conditions, and editor instruction. The master override action is an override of all other packet direction decisions, and is particularly useful for diagnostic purposes. Error conditions receive the next highest priority, and priority among the error conditions may also be applied (e.g., such as an error condition encountered with a "drop" directive having the highest priority). Policing conditions on a policed connection is the next highest priority to guide the direction of the packet. Finally, the direction that is identified within the editor instruction itself is used as the direction for the packet, and where no editor search results are returned for a packet, a programmable default action then determines the packet direction.

The processing functions described herein in connection with the packet transformation function of the editor module may be performed by one or more different processors. For example, one or more physical chips may correspond to various processing modules of the invention, such as the editing module, input processor, output processor, etc. Alternatively, these functions may be carried out by a single processor configured to perform each of the various functions. In accordance with a preferred embodiment of the invention, these functional elements are embodied on a single physical chip, however various processing modules are embedded therein to perform the described functions.

Figure 11:
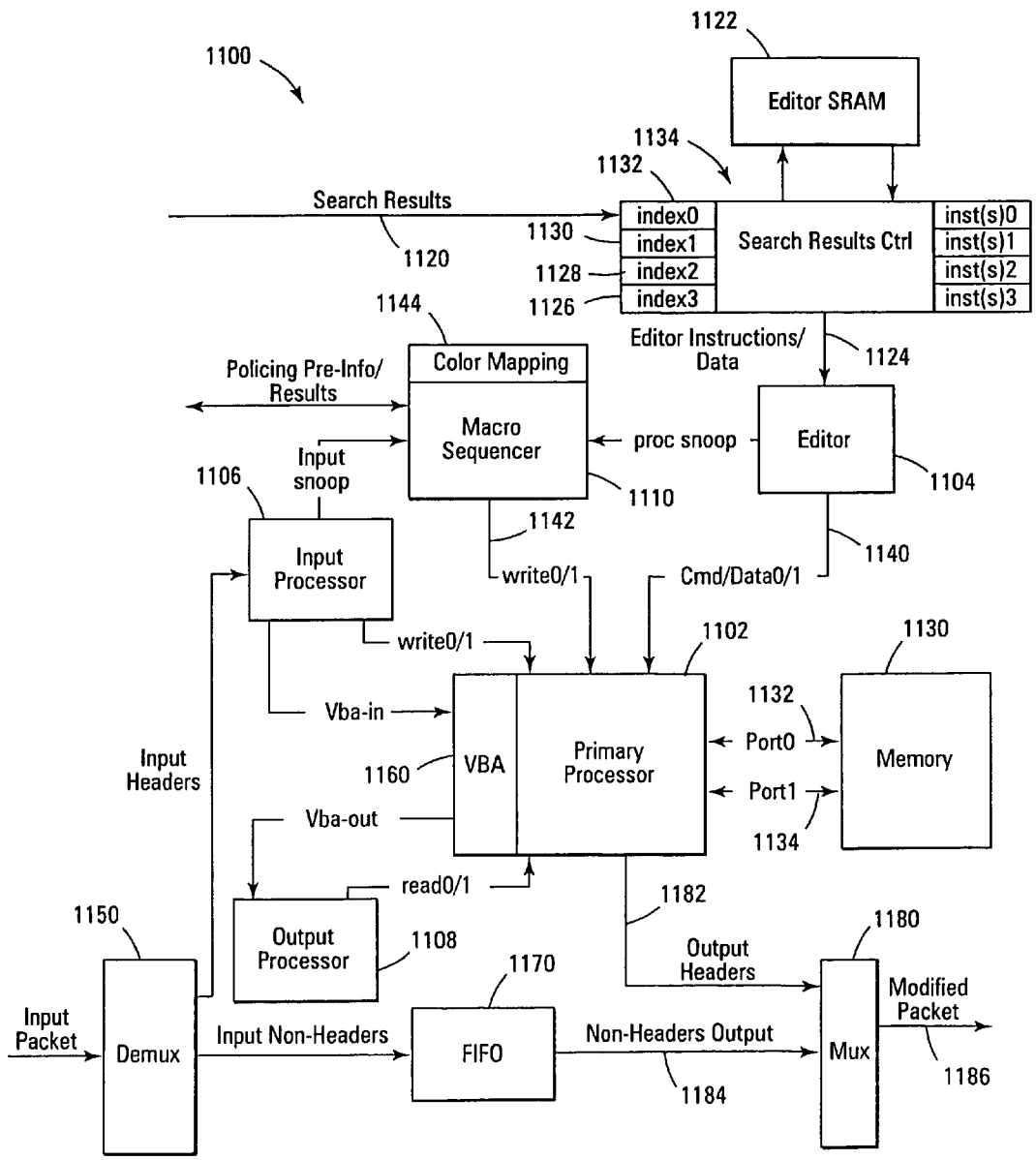
FIG. 11 illustrates an embodiment of an editing module whereby a primary processor controls various processing modules, such as the editor module, input processor, output processor, and macro sequencer.

In accordance with embodiments where various processing modules are employed, whether embedded within a chip or not, a primary control processor may be implemented to help manage and control each of the implemented processing modules. Referring to FIG. 11, an embodiment of an editing module 1100 is illustrated whereby a primary processor 1102 controls various processing modules, such as the editor module 1104, input processor 1106, output processor 1108 and macro sequencer 1110.

The embodiment of FIG. 11 shows the search results on path 1120. These search results serve as indices to the editor SRAM 1122 to provide the editor instructions and data shown on signal path 1124 to the editor 1104. The indices, labeled index-0 126, index-1 128, index-2 130, and index-3 132, are received by the search results control module 1134 which generates the appropriate addresses into the SRAM 1122 from the search result indices 1126, 1128, 1130, 1132.

The editor 1104 and primary processor 1102 may be part of a common processing module, or alternatively may be distinct processing modules. For example, in the example of FIG. 7, the editor 714 represents the processing element to perform the requisite processing to carry out the desired editing functions. In the embodiment illustrated in FIG. 11, the editor 1104 and primary processor 1102 collectively perform editing functions.

More particularly, the editor 1104, macro sequencer 1110, input processor 1106, output processor 1108, and the memory 1130 are all coupled to the primary processor 1102. The memory 1130 is analogous to the memory 716 that stores the information that is to be edited, and in the embodiment of FIG. 11 is a dual-port memory having port-0 1132 and port-1 1134 coupled between the memory 1130 and the primary processor 1102. In this embodiment, the editor 1104 provides command and data on path 1140 to the primary processor 1102 to cause the processor 1102 to carry out modification instructions on the data in the memory 11130. The macro sequencer 1110 provides write commands via path 1142 to the primary processor 1102 to allow the primary processor 1102 to initiate the designated modifications to the data stored in the memory 1130. The macro sequencer 1110 may receive snoop input from the editor 1104, input processor 1106, and/or policing module (not shown) to obtain coloration, which may require further interpretation via the color mapping 1144 information, or other information to initiate the appropriate modifications to the memory 1130.

A demultiplexer 1150 receives packet input, and in the present example, separates the header information from the non-header information. The separation need not be between the header and non-header information, but in the present example, all editing is to be performed on header information. Therefore, the header information is recognized by the input processor 1106, which marks the appropriate fields in the valid bit array 1160, and provides write instructions to indicate where in the memory 1130 the primary processor should store the header information. The non-header information (or alternatively, the information that is not to be available for editing) is sent to the buffer 1170.

Upon completion of editing of the header information in the memory 1130, due at least to the editing instructions identified by the editor 1104 and the macro sequencer 1110, the header and non-header information is reassembled into a resulting modified packet. This is accomplished using the output processor 1108 which reads the valid bit array 1160, and initiates forwarding of information in the memory 1130 to the multiplexer 1180 if the state of the valid bit array 1160 dictates the forwarding of that information. The header information, shown in FIG. 11 as the output headers on signal path 1182 are output from the multiplexer 1180, followed by the information stored in the buffer 1170, shown as the output non-headers on signal path 1184. The resulting modified packet shown on signal path 1186 from the multiplexer 1180 includes the edited headers followed by the non-edited information.

As described above, the embodiment of FIG. 11 represents another embodiment of an editor module in accordance with the present invention. Other variations of these embodiments in accordance with the description provided herein are within the scope of the invention.

Figure 12:
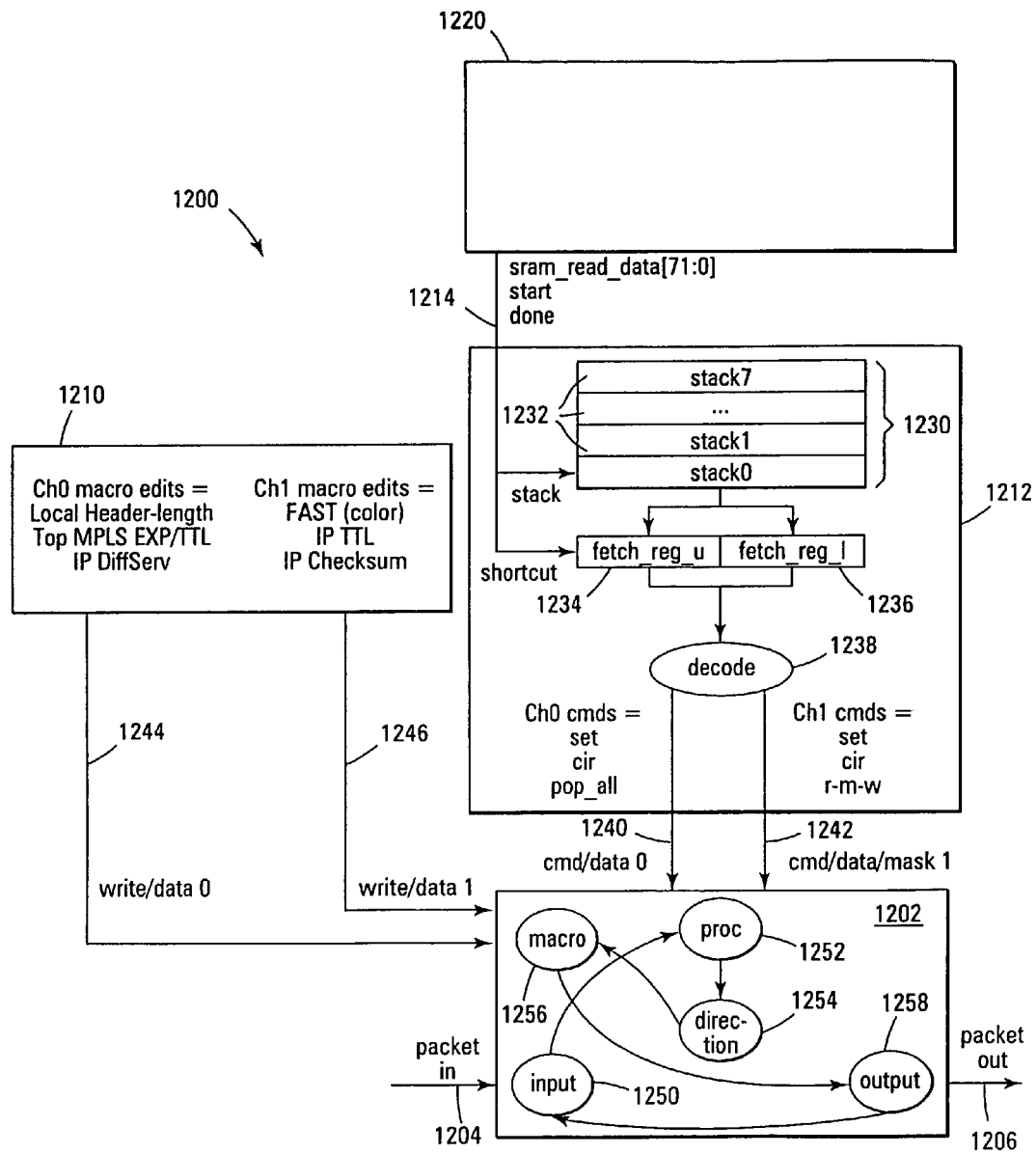
FIG. 12 illustrates another exemplary embodiment of an editor module wherein a primary editor processor is used in connection with other editing components.

FIG. 12 illustrates another embodiment of an editor module 1200 wherein a primary editor processor is used in connection with other editing components. The primary editor processor 1202 performs a process to receive packets at the packet input 1204 and output a modified packet at the packet out 1206. In order to perform these processes, the primary processor 1202 receives information from at least the macro sequencer 1210 and the editor 1212. The editor 1212 receives editor instructions via instruction path 1214, which in one embodiment includes a 72-bit bus. The instruction path 1214 is coupled to the search result module 1220 which uses the search results to address the appropriate editor instructions in memory. These instructions may be queued in a queue 1230 having a plurality of queue locations 1232. The instructions are fetched and stored in upper and lower registers 1234, 1236, and decoded by the decoder 1238. The appropriate commands as determined by the decoder 1238 are sent to the primary processor 1202 via command/data paths 1240, 1242.

Also supplying information to the primary processor 1202 is the macro sequencer 1210. As earlier described, the macro sequencer 1210 may operate on the data being edited to perform certain predefined specific modifications thereto. Such modifications include updating a checksum value, or a time-to-live (TTL) parameter. Policing colorations and changes to packet length due to the addition of local headers are still other examples in which post-editing-processor modifications will be performed. These, or other, commands 1244, 1246 are written from the macro sequencer 1210 to the primary processor 1202, so that the primary processor can carry out the operations to actually modify the packet, particularly the information stored in the editor memory (not shown).

The primary processor 1202 operates as a state machine, as represented in FIG. 12. The packet is input 1250, and the packet is processed 1252 in accordance with the instructions 1240, 1242 supplied by the editor 1212. Header fields in the memory are edited, deleted, supplanted, etc. in order to arrive at modified header fields that ultimately define the direction 1254 of the modified packet. The macro sequencer commands 1244, 1246 are then processed as shown at the macro state 1256. When modifications directed at the macro state are complete, the modified packet is output 1258 as shown on packet output 1206, and the process continues with new input 1250.

FIGS. 13-16 illustrate representative examples of modifications (i.e., packet transformations) that may be performed in accordance with the principles of the present invention. It should be recognized that the examples of FIGS. 13-16 are provided for purposes of understanding, and provide only a representation of the multitude of different types of modifications that may be performed on packets, frames, cells, etc. Therefore, the examples provided in FIGS. 13-16 are illustrative only, and clearly the invention is not limited thereto. Those skilled in the art will readily appreciate that a variety of additional modifications other than those shown for illustrative purposes in FIGS. 13-16 Can be performed in accordance with the teachings of the present invention.

Figure 13:
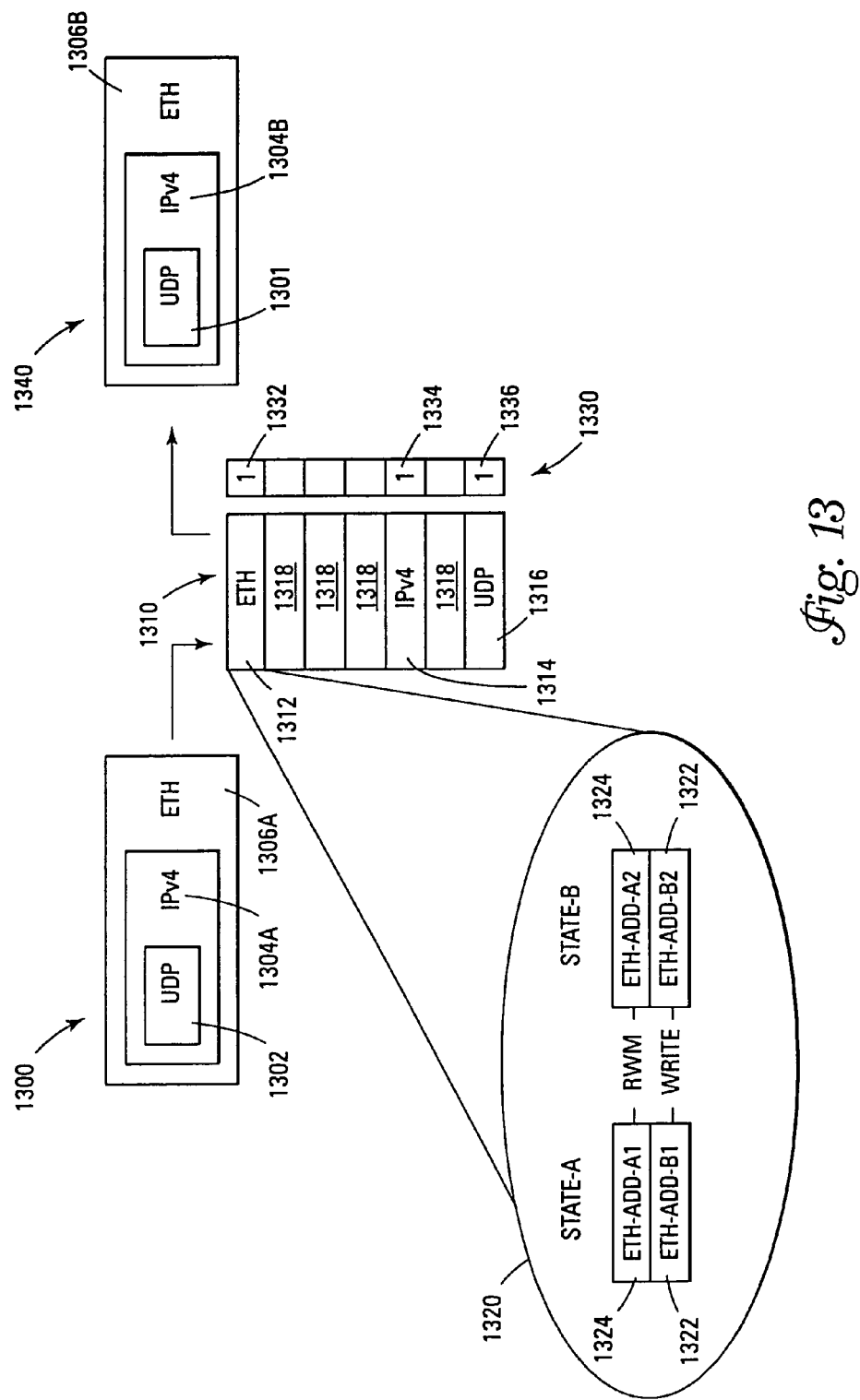
FIG. 13 illustrates an example of a packet transformation at a router handling an IP/Ethernet source route in accordance with the principles of the present invention.

Referring first to FIG. 13, an example is provided of a packet transformation at a router handling an IP/Ethernet source route. In this example, the incoming packet 1300 includes various embedded headers including a layer-4 user datagram protocol (UDP) header 1302, a layer-3 Internet Protocol version-4 user header 1304A, and a layer-2 Ethernet protocol header 1306A. A packet classifier module (not shown) determines where in the packet these different headers start and stop, and the input controller receives this information and writes the packet layers into the editor memory 1310 (also shown, for example, as memory 716 in FIG. 7). The packet layers are written to the editor memory 1310 in a predetermined order, such as from the lowest layer level to the highest. This is illustrated in FIG. 13 on the editor memory 1310, where the Ethernet header is stored at one or more memory locations 1312, the IPv4 header is stored at one or more memory locations 1314, and the UDP header is stored at one or more memory locations 1316. In accordance with the present invention, available memory locations 1318 may be interleaved with the stored header information.

As previously discussed, the parsing engine associated with the classifier module (not shown) acts on the incoming packet to produce search results that index editor instructions. For purposes of example, the resulting editor instructions to the editor module in the present example instruct the editor to replace the Ethernet source address field. The Ethernet source address field may need to be modified or replaced since a router at a node declares itself the new source address as the packet is transmitted through the network to the destination.

Since Ethernet addresses are generally forty-eight bits in length, the forty-eight bit Ethernet address is modified to change the Ethernet source address. For purposes of the present example, the editor memory in the present example is a 32-bit wide memory. Therefore, to modify the 48-bit Ethernet source address, one 32-bit operation is performed on the lower thirty-two bits of the address, and a read-modify-write operation is performed on the upper sixteen bits of the address. This is depicted by the memory state block 1320, showing state-A and the modified state-B of the memory 1310. The original state, state-A, has a lower 32-bit field of the Ethernet source address, labeled Ethernet Address-B1, stored at memory location 1322. The modified state, state-B, occurs due to a write command on the lower 32-bit field of the Ethernet source address, resulting in the modified address portion Ethernet Address-B2 stored at memory location 1322. For the upper sixteen bits, the original state-A has an upper 16-bit field of the Ethernet source address labeled Ethernet Address-A1 stored at memory location 1324. To modify only the desired sixteen bits of the thirty-two bit address field, a read-write-modify (RWM) instruction is executed by the editing processor. This results in the modified state-B, shown as the Ethernet Address-A2 stored at memory location 1324.

In this example, the IPv4 header stored at memory location 1314 may also be operated on by the macro sequencer to perform specific modifications after the editor instructions have been executed. For example, a TTL value may be decremented in the TTL field (not shown) of the IPv4 header at location 1314. The checksum value in the IPv4 header may also be updated to reflect the change to the TTL field.

Following macro sequencer modifications, the header information has been fully modified, and is ready to be output from the editor memory 1310. The fields to be output from the memory 1310 are identified by a corresponding indicator in the valid bit array 1330. For example, the valid bit array 1330 of FIG. 13 depicts asserted fields 1332, 1334 and 1336 corresponding to memory locations 1312, 1314 and 1316 respectively. Thus, the Ethernet header at memory location 1312, the IPv4 header at memory location 1314, and the UDP header at location 1316 are tagged for inclusion in the modified output packet. The outgoing packet 1340 therefore includes various embedded headers including the layer-4 user datagram protocol (UDP) header 1302, the modified layer-3 internet protocol version-4 (IPv4) header 1304B, and the modified layer-2 Ethernet protocol header 1306B. As previously described, any associated data for the output packet is appended to the modified headers output from the editor memory 1310.

Figure 14:
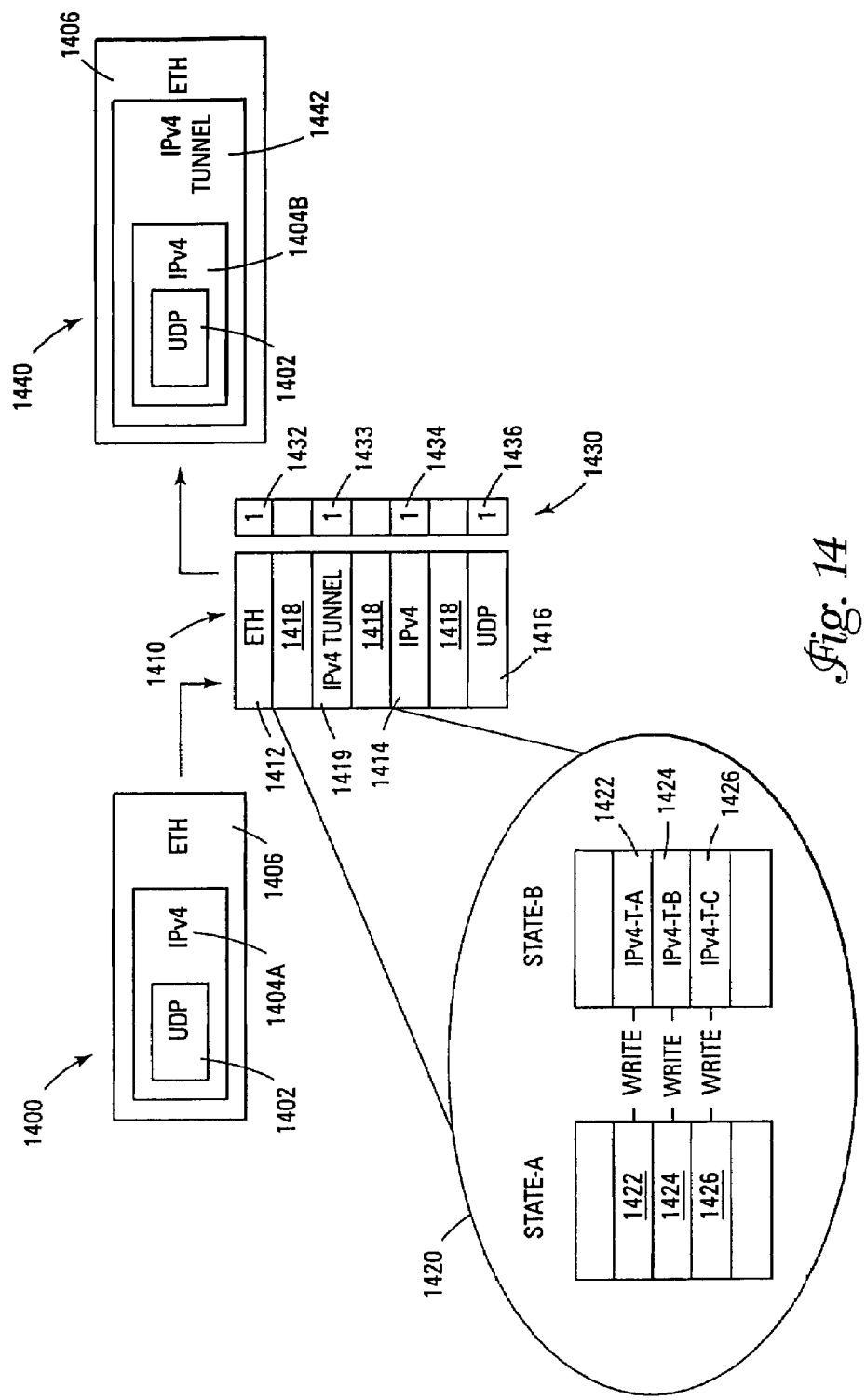
FIG. 14 illustrates another example in accordance with the invention of a packet transformation at a router handling an IP/Ethernet source route, where IP tunneling modifications are also desired.

FIG. 14 represents another example of a packet transformation at a router handling an IP/Ethernet source route, but in this example, IP tunneling modifications are desired. "Tunneling" refers to using the Internet as part of a private secure network, where the tunnel is the particular path that a given message or file might travel through the Internet. Tunneling protocols make it possible to create a virtual private network through such tunnels over the Internet. This would remove the need for entities to lease private lines for wide-area communication, and securely use the public networks using tunneling methodologies. Such tunneling methodologies are known in the art.

According to tunneling methodologies, an additional layer will be required in the outgoing packet than that which was present in the incoming packet. Therefore, the instant example is one which the state of the valid bit array changes to identify another one or more memory locations that must be considered in the outgoing modified information. More particularly, the tunneling header is wedged in between two existing header information blocks, using the unused memory space interleaved throughout the editor memory. These changes are more clearly described in connection with the example of FIG. 14.

Referring to FIG. 14, the incoming packet 1400 includes various embedded headers including a layer-4 user datagram protocol (UDP) header 1402, a layer-3 internet protocol version-4 (IPv4) header 1404A, and a layer-2 Ethernet protocol header 1406. A packet classifier module (not shown) determines where in the packet these different headers start and stop, and the input controller receives this information and writes the packet layers into the editor memory 1410. The packet layers are written to the editor memory 1410, where the Ethernet header is stored at one or more memory locations 1412, the original IPv4 header is stored at one or more memory locations 1414, and the UDP header is stored at one or more memory locations 1416. In accordance with the present invention, available memory locations 1418 may be interleaved with the stored header information. The memory location 1419 is illustrated with the new tunneling IPv4 header, however the pre-modified state of this editor memory location was unused and available. However, in accordance with the editing methodology described, the available memory location 1419 is used for the newly added tunneling IPv4 header, as described more fully below.

The modifications to the editor memory are illustrated by the memory state block 1420, showing state-A and the modified state-B of the memory 1410. The original state of the particular memory locations, shown as state-A, has no valid information associated therewith. The editing processor executes instructions from the instruction memory, which in the present example includes a series of write instructions. More particularly, the tunneling IPv4 header is written to the editor memory 1410, as depicted by the new state-B in memory state block 1420. As can be seen, memory locations 1422, 1424 and 1426 change from being unused at state-A to storing tunneling IPv4 header information at state-B. More particularly, a write command to write the first two words (IPv4-T-A) of the tunneling IPv4 header is first written to memory location 1422, then another write command writes the next two words (IPv4-T-b) of the tunneling IPv4 header to memory location 1424, and a final write command writes a final word (IPv4-T-c) of the tunneling IPv4 header to memory location 1426. These stored words collectively comprise the tunneling IPv4 header, which resides at memory location 1419. Adding the new tunneling IPv4 header causes an indicator in field 1433 of the valid bit array to be set, thereby confirming its ultimate inclusion in the modified output packet.

In this example, the original IPv4 header stored at memory location 1414 may also be operated on by the macro sequencer to perform specific modifications after the editor instructions have been executed. For example, a TTL value may be decremented in the TTL field (not shown) of the original IPv4 header at location 1414. The checksum value in the original IPv4 header may also be updated.

Following macro sequencer modifications, the header information has been fully modified, and is ready to be output from the editor memory 1410. The fields to be output from the memory 1410 are identified by a corresponding indicator in the valid bit array 1430. For example, the valid bit array 1430 of FIG. 14 depicts asserted fields 1432, 1433, 1434 and 1436 corresponding to memory locations 1412, 1419, 1414 and 1416 respectively. Thus, the Ethernet header at memory location 1412, the tunneling IPv4 header at memory location 1419, the IPv4 header at memory location 1414, and the UDP header at location 1416 are tagged for inclusion in the modified output packet. The outgoing packet 1440 therefore includes various embedded headers including the original layer-4 user datagram protocol (UDP) header 1402, the modified internet protocol version-4 (IPv4) header 1404B as well as the new tunneling IPv4 header 1442, and the layer-2 Ethernet protocol header 1406. As previously described, any associated data for the output packet is appended to the modified headers output from the editor memory 1410.

Figure 15:
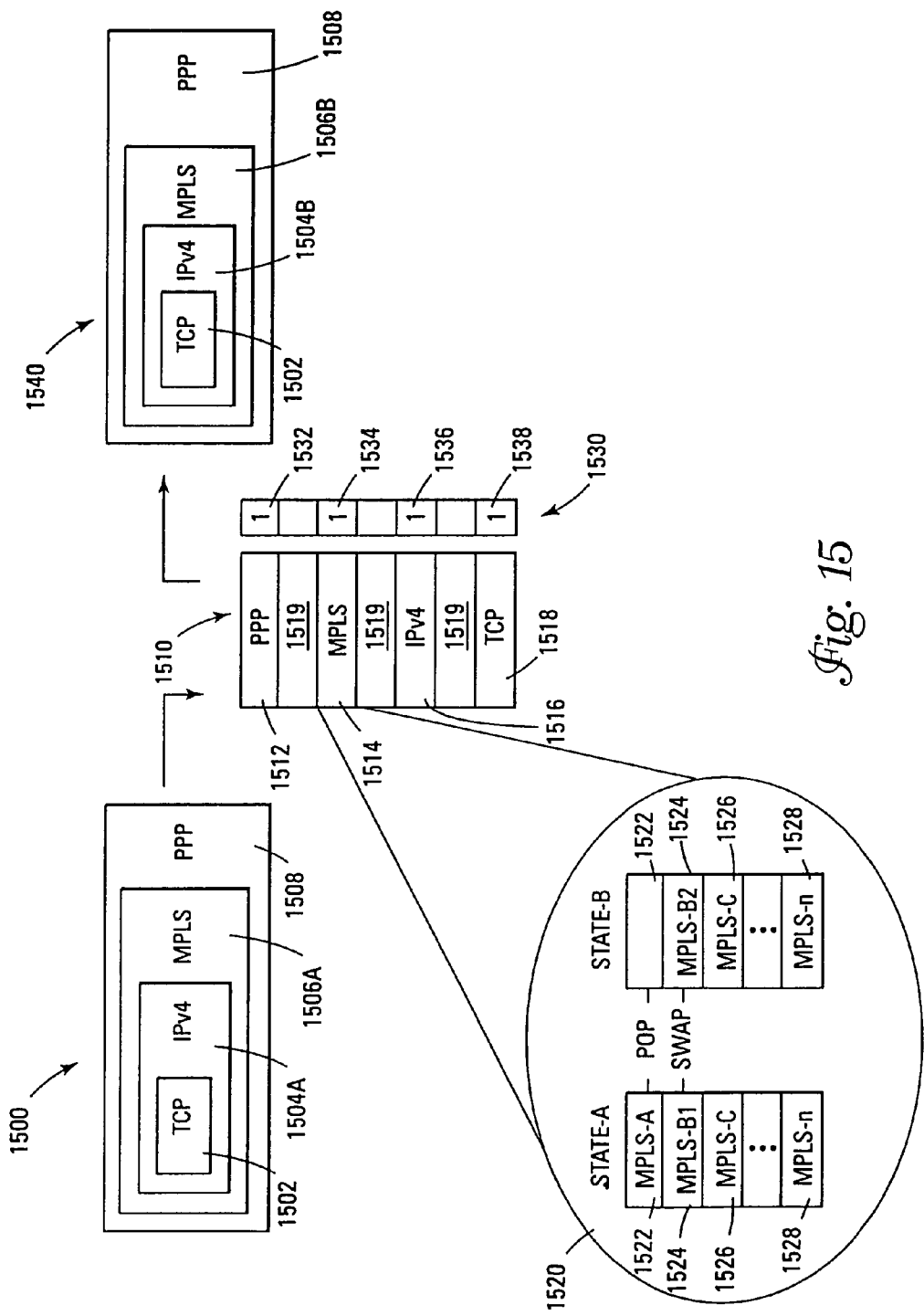
FIG. 15 illustrates another example in accordance with the invention of a packet transformation at a router within a multiprotocol label switching (MPLS) domain.

Referring now to FIG. 15, an example is provided of a packet transformation at a router within a multiprotocol label switching (MPLS) domain, as carried out in accordance with the invention. MPLS integrates layer-2 information about network links into layer-3 (IP) within a particular autonomous system in order to simplify and improve IP-packet exchange. MPLS essentially provides connection-oriented labeling in an otherwise connectionless environment, which has resulted in MPLS being considered associated with layer-2.5. With MPLS, different flows can be classified, and different service levels can be associated with the different flow classifications. MPLS uses a stack of 32-bit labels, and a router will view the top label in the stack to determine what the next hop should be. Each router in the MPLS domain can modify the label stack, such as by adding more labels based on the router's knowledge of the packet forwarding conditions. For example, such a modification may require replacing the existing top label on the label stack with a new label so that a particular router can change one or more of the next hops. A variety of different modifications may be made to the MPLS stack, and the present invention is particularly beneficial in routers in which such modifications are to be made.

The incoming packet 1500 includes various embedded headers including a layer-4 transmission control protocol (TCP) header 1502, a layer-3 internet protocol version-4 (IPv4) header 1504A, a layer-2.5 MPLS header 1506A, and a layer-2 point-to-point protocol (PPP) header 1508. A packet classifier module (not shown) determines where in the packet these different headers start and stop, and the input controller receives this information and writes the packet layers into the editor memory 1510. The packet layers are written to the editor memory 1510, where the PPP header is stored at one or more memory locations 1512, the MPLS header is stored at one or more memory locations 1514, the IPv4 header is stored at one or more memory locations 1516, and the TCP header is stored at one or more memory locations 1518. In accordance with the present invention, available memory locations 1519 may be interleaved with the stored header information.

The modifications to the editor memory are illustrated by the memory state block 1520, showing state-A and the modified state-B of the memory 1510. The original state of the particular memory locations, shown as state-A, includes an MPLS label stack including label MPLS-A at location 1522, label MPLS-B1 at location 1524, label MPLS-C at location 1526, through a finite number of labels represented by MPLS-n at location 1528. The editing processor executes instructions from the instruction memory, which in the present example includes instructions to pop the top MPLS label and swap the next MPLS label with a new MPLS label. This is depicted in the memory state block, where label MPLS-A at memory location 1522 is "popped" off the top of the state-A stack through editor processing of a pop instruction, resulting in no label stored at location 1522 as shown at state-B. A second editor instruction, a "swap" instruction, causes the MPLS-B1 label at location 1524 to be swapped with a new label, shown in modified state-B as label MPLS-B2 at location 1524.

In this example, the IPv4 header stored at memory location 1516 may also be operated on by the macro sequencer to perform specific modifications after the editor instructions have been executed. For example, a TTL value may be decremented in the TTL field (not shown) of the IPv4 header at location 1516.

Following macro sequencer modifications, the header information has been fully modified, and is ready to be output from the editor memory 1510. The fields to be output from the memory 1510 are identified by a corresponding indicator in the valid bit array 1530. For example, the valid bit array 1530 of FIG. 15 depicts asserted fields 1532, 1534, 1536 and 1538 corresponding to memory locations 1512, 1514, 1516 and 1518 respectively. Thus, the PPP header at memory location 1512, the modified MPLS header at memory location 1514, the IPv4 header at memory location 1516, and the TCP header at location 1518 are tagged for inclusion in the modified output packet. The outgoing packet 1540 therefore includes various embedded headers including the original layer-4 transmission control protocol (TCP) header 1502, the modified internet protocol version-4 (IPv4) header 1504B as modified by the macro sequencer, the modified layer-2.5 MPLS header 1506B as modified by the editor instructions, and the layer-2 PPP header 1508. As previously described, any associated data for the output packet is appended to the modified headers output from the editor memory 1510.

Figure 16:
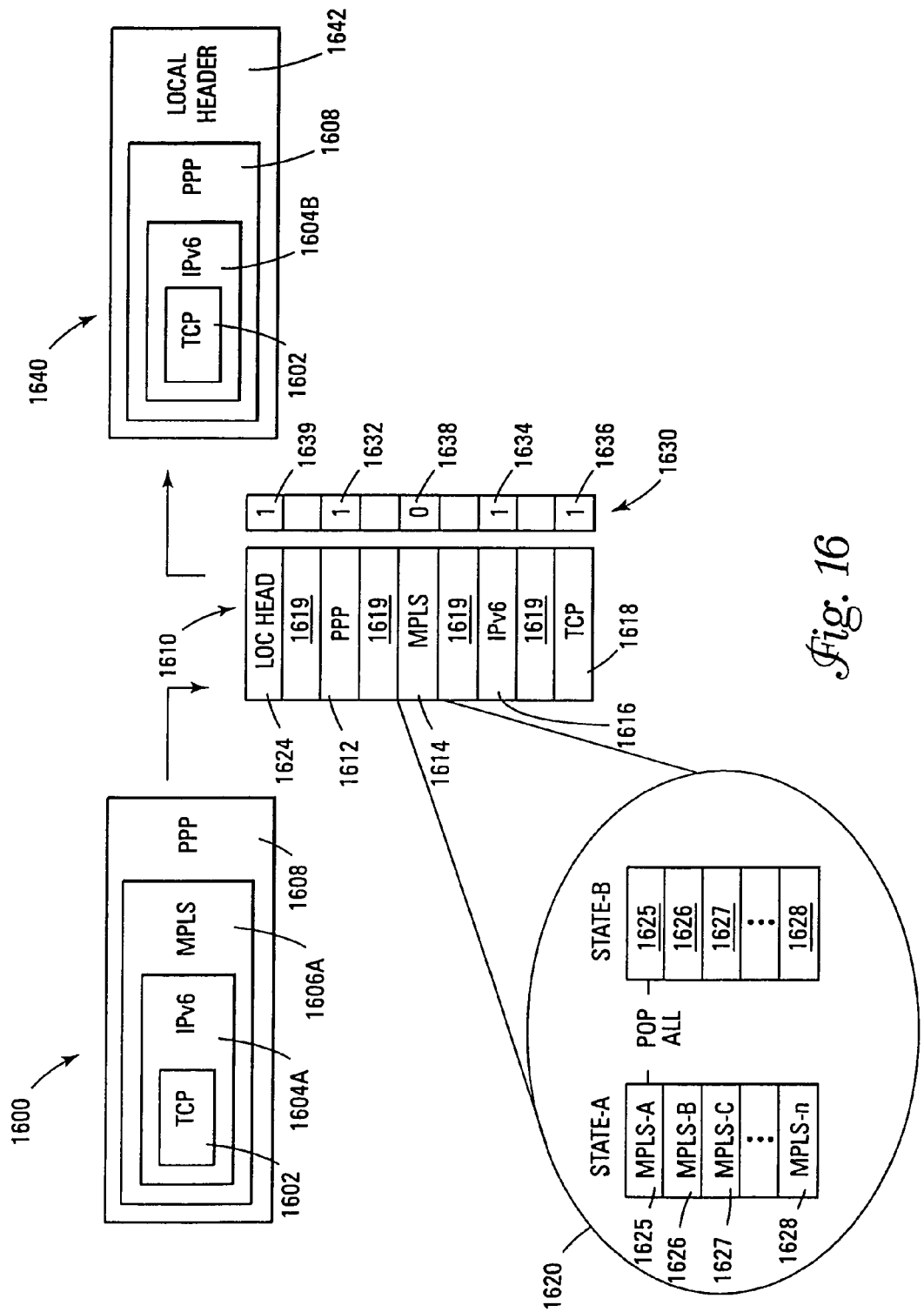
FIG. 16 illustrates yet another example in accordance with the invention of a packet transformation at a router at the egress edge of an MPLS domain.

A final example is provided in FIG. 16. FIG. 16 provides an example of a packet transformation at a router at the egress edge of an MPLS domain, in accordance with the present invention. This example also contemplates the implementation of a local header applied by the router to direct the packet through the switch fabric to a specific output port at the router.

In this embodiment, the incoming packet 1600 includes various embedded headers including a layer-4 transmission control protocol (TCP) header 1602, a layer-3 internet protocol version-6 (IPv6) header 1604A, a layer-2.5 MPLS header 1606A, and a layer-2 point-to-point protocol (PPP) header 1608. A packet classifier module (not shown) determines where in the packet these different headers start and stop, and the input controller receives this information and writes the packet layers into the editor memory 1610. The packet layers are written to the editor memory 1610, where the PPP header is stored at one or more memory locations 1612, the MPLS header is stored at one or more memory locations 1614, the IPv6 header is stored at one or more memory locations 1616, and the TCP header is stored at one or more memory locations 1618. In accordance with the present invention, available memory locations 1619 may be interleaved with the stored header information.

Some modifications to the editor memory are illustrated by the memory state block 1620, showing state-A and the modified state-B of the memory 1610. The original state of the particular memory locations, shown as state-A, includes an MPLS label stack including label MPLS-A at location 1625, MPLS-B at location 1626, MPLS-C at location 1627, through MPLS-n at location 1628. The editing processor executes a "PopAll" instruction to remove all MPLS labels. This is depicted in the memory state block, where all labels MPLS-A, MPLS-B, MPLS-C, MPLS-D at memory locations 1625, 1626, 1627, 1628 respectively are "popped" from the state-A stack through editor processing of a PopAll instruction, resulting in no label stored at locations 1625, 1626, 1627, 1628 as shown at state-B. At this point, the resulting packet would be PPP/IPv6/TCP. However, the present example also contemplates another editor instruction, which is a write instruction to write one or more words of a local header which is inserted on the editor memory 1610 at location 1624 preceding the layer-2 PPP header. This local header will allow the router to direct the packet through the switch fabric to a specific output port.

In this example, the IPv6 header stored at memory location 1616 may also be operated on by the macro sequencer to perform specific modifications after the editor instructions have been executed. For example, a TTL value may be decremented in the TTL field (not shown) of the IPv6 header at location 1616. Further, the local header of the present example includes a packet length field which can be updated by the macro sequencer after all editor instructions have been executed. A new coloration to the packet based on input from the policer may also be included by the macro sequencer.

Following macro sequencer modifications, the header information has been fully modified, and is ready to be output from the editor memory 1610. The fields to be output from the memory 1610 are identified by a corresponding indicator in the valid bit array 1630. For example, the valid bit array 1630 of FIG. 16 depicts asserted fields 1632, 1634, and 1636 corresponding to memory locations 1612, 1616 and 1618 respectively. However, field 1638 of the valid bit array 1630 may be cleared, as all MPLS header information was removed during the editing process. Further, field 1639 of the valid bit array is now asserted, due to the inclusion of the local header into the memory at location 1624. Thus, the local header at memory location 1624, the PPP header at memory location 1612, the modified IPv6 header at memory location 1616, and the TCP header at location 1618 are tagged for inclusion in the modified output packet. The modified outgoing packet 1640 therefore includes various embedded headers including the original layer-4 transmission control protocol (TCP) header 1602, the modified internet protocol version-6 (IPv6) header 1604B as modified by the macro sequencer, the layer-2 PPP header 1608, and the newly added local header 1642. As previously described, any associated data for the output packet is appended to the modified headers output from the editor memory 1610.

Figure 17:
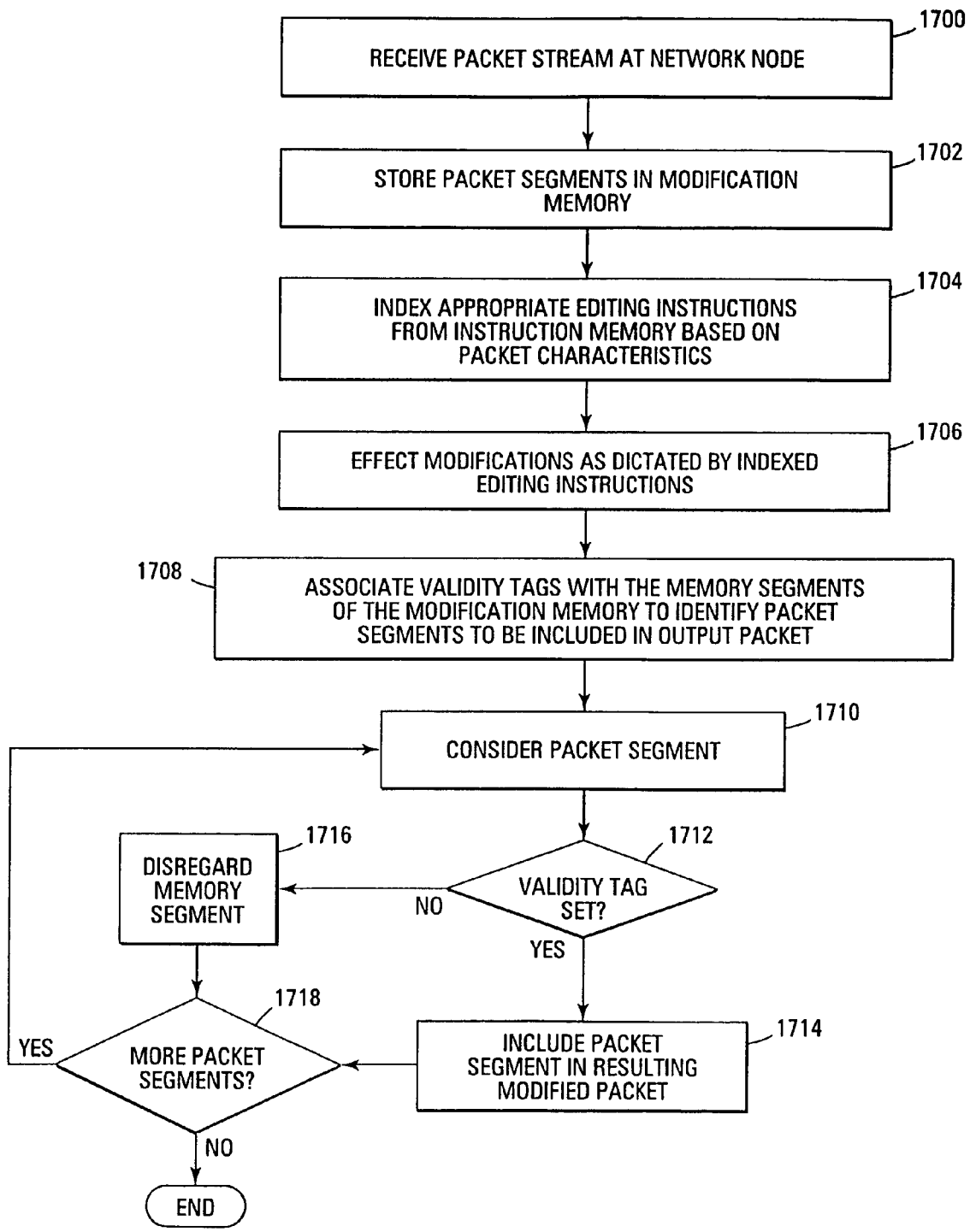
FIG. 17 is a flow diagram illustrating an embodiment of a method for modifying a packet stream in accordance with the present invention.

Referring now to FIG. 17, a flow diagram is provided to illustrate an embodiment of a method for modifying a packet stream in accordance with the present invention. A packet stream including one or more packets, frames, cells, or other data units is received at a network node as shown at block 1700. For a given packet, particular segments of the packet are stored 1702 in a modification memory designated to temporarily store these packet segments during the modification process. For example, one such memory was depicted as memory 716 in FIG. 7. The modification memory includes a plurality of memory locations that are logically partitioned into different memory segments, such that the different packet segments of the packet can be stored in these different memory segments. In one embodiment, this "partitioning" can be accomplished by tracking at least the starting addresses of each of the packet segments stored in the modification memory.

In addition to storing the various packet segments in the modification memory, an instruction memory (which may include a data storage portion) may be called upon to output instructions for modifying the data temporarily stored in the modification memory. Thus, the appropriate editing instructions are indexed or otherwise elicited from the instruction memory, where the particular editing instructions being elicited depends on the characteristics of the packet, as shown at block 1704. For example, if the packet includes an embedded MPLS header, this MPLS header information is a "characteristic" of the packet that may be used to designate the appropriate one or more instructions from the instruction memory. In one embodiment, these characteristics are determined via the classification/parsing engine (e.g., classifier 502 shown in FIGS. 5 and 6) and are presented to the instruction memory in the form of the search results (e.g., search results 708 of FIG. 7).

The indexed editing instructions are processed to execute modification operations on the packet segments in the modification memory. Thus, modifications are effected 1706 as dictated by the indexed editing instructions. A "modification" may include altering existing packet segment data, inserting new packet segment data, deleting or otherwise canceling existing packet segment data, or any other manner of changing the packet data.

In order to identify packet segments to be included in the resulting output packet (whether altered, added, canceled, etc.), validity tags are associated with each of the memory segments of the modification memory, as shown at block 1708. A "validity tag" represents any stored indicator, such as one or more bits in a memory or register field. As previously described, one such embodiment is a valid bit array which includes a plurality of fields, each of which stores a validity tag. In a more particular embodiment provided for purposes of example, each of the individual bits of a register can represent the fields of a valid bit array, such that each bit in the register therefore represents a validity tag.

Upon consideration of a first packet segment as illustrated at block 1710, it is determined 1712 whether or not that packet segment's associated validity tag is set. It should be noted that the particular logical state of a "set" validity tag is not of particular relevance to the invention, and a "set" validity tag may therefore be represented by a high logic state, a low logic state, a bit pattern, or any other such determinable electronic representation. If the validity tag associated with a particular packet segment is set, then that packet segment is included 1714 in the resulting modified packet. If the validity bit is not set, that memory segment is disregarded 1716, i.e., the data at that memory segment is not included in the resulting modified packet. Where more packet segments are stored as determined at decision block 1718, these additional packet segments are considered 1710 to determine whether they too will, or will not, be included in the resulting modified packet. As can be seen, a modified packet is thus created by assembling the packet segments associated with asserted or "set" validity tags.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A method for multi-protocol packet transfer over a communication network comprising:

receiving at an ingress port, a first packet of information transferred over the communication network from a source using a first layered transmission protocol, the information segmented into a data portion and an ingress header portion in accordance with the first layered transmission protocol;

resolving each layer associated with the first layered transmission protocol to obtain an identity of the first layered transmission protocol;

fetching a set of parsing instructions from a first instruction memory beginning at a location indicated by the identity of the first layered transmission protocol;

executing the set of parsing instructions to extract segments of a search key from the information;

building a search key by assembling the search key segments and applying the search key to a content-addressable-memory to obtain a classification of the information into a plurality of flows;

enforcing a policing function on each of the plurality of flows based upon pre-defined policing criteria associated with said each of said plurality of flows;

based upon the classification, fetching a set of editing instructions from a second instruction memory;

applying the editing instructions to the information to generate an intermediate egress header portion;

manipulating the intermediate egress header portion in response to the policing function enforced on the flow associated with the information to build the egress header portion compliant with a second layered transmission protocol;

assembling a second packet of information from the data portion and the egress header portion; and transmitting the second packet of information towards a destination through an egress port of a switch fabric using the second layered transmission protocol.

2. The method of claim 1 wherein the parsing instructions are programmatically alterable.

3. The method of claim 1 wherein the policing criteria is programmatically alterable.

4. The method of claim 1 wherein the editing instructions are programmatically alterable.

5. The method of claim 1 wherein the first packet of information includes at least one embedded header associated with a third layered transmission protocol different than the first and second layered transmission protocols and wherein at least a part of the egress header portion is associated with a fourth layered transmission protocol representing a modification of one or more of the first, second and third layered transmission protocols.

6. The method of claim 1 wherein the first packet of information includes at least one embedded header associated with a third layered transmission protocol different than the first and second layered transmission protocols and wherein at least a part of the egress header portion is associated with a fourth layered transmission protocol obtained by modifying at least one of the first, second and third layered transmission protocols.

7. The method of claim 6 wherein the modifying step includes one or more steps of altering the first packet of information, inserting new information in the first packet of information, deleting a portion of the first packet of information, and transforming the first packet of information.

8. The method of claim 1 wherein the step of assembling the second packet of information is completed concurrent with receiving a next packet of information transferred over the communication network at the ingress port.

9. The method of claim 8 wherein the packets of information are received at the ingress port at a rate upwards of 10 Gigabits per second.

* * * * *